(12) United States Patent
Teraoka

(10) Patent No.: US 7,216,751 B2
(45) Date of Patent: May 15, 2007

(54) TORQUE TRANSMISSION COUPLING

(75) Inventor: Masao Teraoka, Tochigi (JP)

(73) Assignee: Tochigi Fuji Sangyo Kabushiki Kaisha, Tochigi-shi (JP)

( * ) Notice: Subject to any disclaimer, the term of this patent is extended or adjusted under 35 U.S.C. 154(b) by 30 days.

(21) Appl. No.: 10/816,012

(22) Filed: Mar. 31, 2004

(65) Prior Publication Data

US 2004/0192487 A1    Sep. 30, 2004

(30) Foreign Application Priority Data

Mar. 31, 2003   (JP)   ............................. 2003-093886
Mar. 31, 2003   (JP)   ............................. 2003-093887
Nov. 14, 2003   (JP)   ............................. 2003-385838

(51) Int. Cl.
*B60K 23/08* (2006.01)
*F16D 28/00* (2006.01)

(52) U.S. Cl. .................. 192/84.6; 192/30 W; 475/150

(58) Field of Classification Search .............. 192/84.6, 192/84.7
See application file for complete search history.

(56) References Cited

U.S. PATENT DOCUMENTS

| 2,037,206 | A | * | 4/1936 | Boden | .......................... 74/424 |
| 2,368,963 | A | * | 2/1945 | Boden | ......................... 184/11.1 |
| 2,548,258 | A | * | 4/1951 | Bain | ........................... 475/245 |
| 3,744,274 | A | * | 7/1973 | Sekiya et al. | ................ 464/160 |
| 4,976,347 | A | * | 12/1990 | Sakakibara et al. | ......... 192/84.6 |
| 6,848,550 | B2 | * | 2/2005 | Puiu et al. | .................. 192/84.6 |
| 6,951,521 | B2 | * | 10/2005 | Hakui | ......................... 192/84.6 |
| 2002/0144876 | A1 | * | 10/2002 | Harvey | ..................... 192/30 W |

FOREIGN PATENT DOCUMENTS

JP        2715340         11/1997

* cited by examiner

*Primary Examiner*—Rodney H. Bonck
(74) *Attorney, Agent, or Firm*—Jordan and Hamburg LLP

(57) ABSTRACT

In order to form a torque transmission coupling to be compact, the present invention provides a torque transmission coupling (1) comprising input-output rotary members (57, 59) rotatably supported to perform input-output transmission of torque; a frictional engagement section (79) provided between the input-output rotary members to perform torque transmission between the input-output rotary members by enforcing frictional engagement; a compression member set (87) that comprises a pair of members (89, 91) capable of performing relative rotation and that generates thrust through the relative rotation between the members to thereby cause the frictional engagement section to perform the frictional engagement; and a rotary actuator (121) that causes both of the members of the compression member set to perform engagement-rotational driving whereby to cause the relative rotation.

8 Claims, 18 Drawing Sheets

TORQUE TRANSMISSION COUPLING

BACKGROUND OF THE INVENTION

1. Field of the Invention

The present invention relates to a torque transmission coupling for an automobile.

2. Description of the Related Art

Conventional torque transmission couplings include a torque transmission coupling incorporated with, for example, a transfer device as disclosed in Japanese Patent Application Laid-Open No. 2715340.

The transfer device has a torque transmission coupling. The torque transmission coupling has a clutch cage and a sleeve. A friction clutch is provided between the clutch cage and the sleeve. The friction clutch has outer plates and inner plates. The outer plates engage the clutch cage and the inner plates engage the sleeve.

A compression ring is disposed in opposition to the friction clutch. The compression ring engages a transfer case in the rotational direction, and is movable along the center axis of rotation. A support ring is disposed in opposition to the compression ring. A cam mechanism is provided between the support ring and the compression ring.

A gear engages the support ring. The gear is co-rotatably coupled to a shaft. The shaft is co-rotatably coupled to a driving shaft of a servomotor through an other gear and a pinion.

An output shaft for outputting torque to the sides of rear wheels is coupled to the clutch cage. The output shaft is co-rotatably coupled to an input shaft. The input shaft is transmitted a torque from an engine that receives a rotational input from the engine.

As such is the construction, the torque is transmitted to the input shaft from the engine. The torque transmitted to the input shaft is transferred, as it is, to the sides of the rear wheels through the output shaft. On the other hand, the torque is transferred to the sides of front wheels in response to the engagement of the friction clutch.

The engagement of the friction clutch is conducted by driving the servomotor. With the servomotor being driven, the pinion is rotated with the driving shaft of the servomotor, and the gear is rotated through the other gear and the shaft. With the rotation, the support ring is rotated within a range of 180 degrees, and rotates relative rotation with respect to the compression ring. The relative rotation causes the cam mechanism to function, and a thrust of the cam mechanism causes movement of the compression ring toward the friction clutch. This movement causes the engagement of the friction clutch.

However, according to the construction described above, a decelerating mechanism using the support ring, the gear, the other gear, and the pinion is large, so that it is hard to install the decelerating mechanism in a narrow spacing in the transfer device.

SUMMARY OF THE INVENTION

An object of the present invention is to provide a torque transmission coupling capable of being formed compact.

A first aspect of the present invention provides a torque transmission coupling comprising input-output rotary members rotatably supported to perform input-output transmission of torque; a frictional engagement section provided between the input-output rotary members to perform torque transmission between the input-output rotary members by enforcing frictional engagement; a compression member set that comprises a pair of members capable of performing relative rotation and that generates thrust through the relative rotation between the members to thereby cause the frictional engagement section to perform the frictional engagement; and a rotary actuator that causes both of the members of the compression member set to perform engagement-rotational driving whereby to cause the relative rotation.

Accordingly, the pair of members is operated by the driving rotary actuator to perform the relative rotation. The relative rotation of the pair of members causes the compression member set to generate the thrust. The frictional engagement section is engaged by the thrust, thereby enabling torque transmission to be performed between the input-output rotary members in correspondence to an engagement force of the frictional engagement section.

As such, since the rotational driving of the rotary actuator can be much decelerated to be converted into a compression force, a decelerating mechanism, the rotary actuator, and the like can be miniaturized. This consequently enables the construction to be formed compact.

A second aspect of the present invention provides a torque transmission coupling comprising an input-output rotary members to perform input-output transmission of torque; a fractional engagement section provided between the input-output rotary members to perform torque transmission between the input-output rotary members by enforcing frictional engagement; a compression gear set having a pair of gears, a planetary gear engaged with the gears and a planetary carrier for supporting the planetary gear converts an input generated by rotational driving into a compression force in the direction along a rotation axis by that any one of the pair of gears, the planetary gear, and the planetary carrier is non-rotatably supported, any other one thereof is rotationally driven, and the other thereof performs the relative rotation to thereby cause the frictional engagement section to enforce the frictional engagement, and a rotary actuator performs the rotational driving, and since gear ratios or engagement radii between the pair of individual gears and the planetary gear are different from each other, the relative ration is performed.

Accordingly, when the rotational driving is performed with the rotary actuator, since the gear ratios or the engagement radii between the pair of individual gears and the planetary gear are set differently from each other, the one of the pair of gears can be operated to perform the relative rotation at a low velocity with respect to the other of the pair of gears. Alternatively, the planetary carrier can be operated to perform the relative rotation at a low velocity with respect to the one of the pair of gears. With the low-velocity relative rotation, input generated by the rotational driving can be converted into a compression force in the direction along the rotation axis, and the frictional engagement section can be frictionally engaged.

That is, according to the construction having the pair of gears and the planetary gear engaged with the gears, in which the gear ratio or the engagement radii between the pair of individual gears and the planetary gear are set to be different from each other, thereby enabling the rotational driving of the rotary actuator to be much decelerated to convert into the compression force. As such, the decelerating mechanism, the rotary actuator, and the like can be miniaturized, and hence the construction can be formed compact.

Accordingly, it can be very easily disposed even in a small spacing. In addition, since the rotary actuator can be miniaturized, a weight reduction of the torque transmission coupling also can be implemented. Further, since the rotational driving of the rotary actuator can be much decelerated to convert into the compression force, the frictional engagement section can be easy and accurate to adjust the frictional engagement.

According to a third aspect of the present invention, a torque transmission coupling is the torque transmission coupling according to the second aspect such that the rotary actuator performs the rotational driving of the planetary carrier; the one of the pair of gears is non-rotatably supported; a cam mechanism is interposed between the pair of gears due to the relative rotation between the gears; and the gear ratios between the pair of individual gears and the planetary gear are different from each other.

Accordingly, when the planetary gear is operated to perform revolution by the rotational driving of the rotary actuator through the planetary carrier, the planetary gear performs engagement rotation with respect to the pair of gears. In this case, because of the difference between the gear ratios, the other of the pair of gears performs the relative rotation at a low velocity with respect to the one of the pair of gears supported in a support body side. With the relative rotation, the cam mechanism between the pair of gears generates thrust. The thrust enables the frictional engagement section to be compressed, whereby the frictional engagement section can be frictionally engaged. Consequently, the frictional engagement section can be operated to perform secure frictional engagement.

According to a forth aspect of the present invention, a torque transmission coupling is the torque transmission coupling according to the second aspect such that the rotary actuator performs the rotational driving of the one of the pair of gears; the planetary carrier is non-rotatably supported; a cam mechanism is interposed between the pair of gears to generate a thrust due to the relative rotation between the gears; and the gear ratios or the engagement radii between the pair of individual gears and the planetary gear are different from each other.

Accordingly, when the one of the pair of gears is rotationally driven by the rotational driving of the rotary actuator, the planetary gear supported by the planetary carrier performs rotation, and the other of the pair of gears performs the relative rotation at a low velocity with respect to the one of the pair of gears. With the relative rotation, the cam mechanism generates thrust. The thrust enables the frictional engagement section to be compressed, whereby the frictional engagement section can be frictionally engaged.

Further, the planetary carrier enables to be formed into a simple structure and to be formed even more compact.

According to a fifth aspect of the present invention, a torque transmission coupling according to the second aspect such that the rotary actuator performs the rotational driving of the one of the pair of gears; the other of the pair of gears is non-rotatably supported; a cam mechanism is interposed between the other of the pair of gears and the planetary carrier to generate a thrust due to the relative rotation; and the engagement radii between the pair of individual gears and the planetary gear are different from each other.

Accordingly, when the one of the pair of gears is rotationally driven by the rotational driving of the rotary actuator, the planetary gear rotates between the gears to perform a revolution. With the revolution, the planetary carrier is much decelerated to perform the relative rotation at a low velocity with respect to the other of the pair of gears. With the relative rotation, the cam mechanism generates thrust. The thrust enables the frictional engagement section to be compressed, whereby the frictional engagement section can be frictionally engaged.

In addition, the one of the pair of gears may be integrally provided on the rotary actuator, and the other thereof may be integrally provided in the support body side such as housing. Thereby, the number of components can be reduced, and hence the construction can be formed even more compact.

According to a sixth aspect of the present invention, a torque transmission coupling according to any one of the second to fifth aspects, wherein the planetary carrier is supported to be capable of performing constant-angle relative rotation; an urging member to be interposed between the planetary carrier and a support body side is provided to interfere to rotation with an urging force for the planetary carrier that rotates in the same direction at the time of the rotational driving by the rotary actuator; the torque transmission coupling further comprises displacement detection means that detects a displacement amount when the planetary carrier performs rotational displacement in resistance with the urging member; and an engagement force of the frictional engagement section is obtained in accordance with the displacement amount detected.

Accordingly, the process such as the fine engagement adjustment of the frictional engagement section can be accurately performed.

A seventh aspect of the present invention provides a torque transmission coupling comprising input-output rotary members rotatably supported with respect to a support body side to perform input-output transmission of torque; a frictional engagement section provided between the input-output rotary members to perform torque transmission between the input-output rotary members by enforcing frictional engagement; a compression member set that comprises a pair of members capable of performing relative rotation and that generates thrust through the relative rotation between the members to thereby cause the frictional engagement section to perform the frictional engagement; and a rotary actuator that causes at least one of the members of the compression member set to perform rotational driving whereby to cause the relative rotation, wherein the one of the pair of members is supported in the support body side in the direction along the rotation axis; and the thrust is exerted on the other member as a reaction force with respect to the support body side whereby to cause the frictional engagement to be performed.

Accordingly, the thrust generated through the compression member set can securely be received in the support side without requiring special members, and the reaction force can securely be exerted on the other member. More specifically, since special members are not required to receive the thrust, the frictional engagement of the frictional engagement section can be sufficiently performed. Concurrently, a weight increase can be restrained, and disposition can be performed even in a narrow spacing.

According to a eighth aspect of the present invention, a torque transmission coupling according to the seventh aspect, wherein the compression member set comprises a pair of gears, a planetary gear engaged with the gears and a planetary carrier for supporting the planetary gear, gear ratios or engagement radii between the pair of individual gears and the planetary gear are different from each other; and converts an input generated by rotational driving into a compression force in the direction along the rotation axis to thereby cause the frictional engagement section to enforce the frictional engagement, wherein any one of the pair of gears, the planetary gear, and the planetary carrier is non-rotatably supported; and any other one thereof is rotationally driven.

Accordingly, with the rotational driving being performed with the rotary actuator, the one of the pair of gears can be operated to perform the relative rotation at a low velocity with respect to the other of the pair of gears, or the planetary carrier can be operated to perform the relative rotation at a low velocity with respect to the one of the pair of gears. With the low-velocity relative rotation, input generated by the rotational driving can be converted into a compression force in the direction along the rotation axis, and the frictional engagement section can be frictionally engaged.

That is, according to the construction having the pair of gears and the planetary gear engaged with the gears, in which the gear ratio or the engagement radii between the pair of individual gears and the planetary gear are set to be different from each other, thereby enabling the rotational driving of the rotary actuator to be much decelerated to convert into the compression force. As such, the decelerating mechanism, the rotary actuator, and the like can be miniaturized, and hence the construction can be formed compact.

Accordingly, it can be very easily disposed even in a small spacing. In addition, since the rotary actuator can be miniaturized, a weight reduction also can be implemented. In addition, since the rotational driving of the rotary actuator can be much decelerated to convert into the compression force, the frictional engagement section can be easy and accurate to adjust the frictional engagement.

According to a ninth aspect of the present invention, a torque transmission coupling according to the eighth aspect, wherein the rotary actuator performs the rotational driving of the planetary carrier; the one of the pair of gears is non-rotatably supported in the direction along the rotation axis; a cam mechanism is interposed between the pair of gears; and the gear ratios between the pair of individual gears and the planetary gear are different from each other.

Accordingly, when the planetary gear is operated to perform revolution by the rotational driving of the rotary actuator through the planetary carrier, the planetary gear performs engagement rotation with respect to the pair of gears. In this case, because of the difference between the gear ratios, the other of the pair of gears performs the relative rotation at a low velocity with respect to the one of the pair of gears supported in a support body side. With the relative rotation, the cam mechanism between the pair of gears generates thrust. The thrust exerts the one gear, and the one gear is received in the support body side. A force exerts on the other gear as a reaction force of the thrust. The exertion of this force moves the other gear, thereby enabling the frictional engagement section to be compressed, whereby the frictional engagement section can be frictionally engaged. Consequently, the frictional engagement section can be operated to perform secure frictional engagement.

According to a tenth aspect of the present invention, the torque transmission coupling according to the eighth invention, wherein the rotary actuator performs the rotational driving one of the pair gears; the planetary carrier is supported in the support body side to be non-rotatable; a cam mechanism is interposed between the pair of gears;

and the one of the pair of gears is supported in the support body side in the direction along the rotation axis; and gear ratios or engagement radii between the pair of individual gears and the planetary gear are different from each other.

Accordingly, when the one of the pair of gears is rotationally driven by the rotational driving of the rotary actuator, the planetary gear supported by the planetary carrier performs rotation, and the other of the pair of gears performs the relative rotation at a low velocity with respect to the one of the pair of gears. With the relative rotation, the cam mechanism generates thrust. The thrust exerts the one gear, and the one gear is received in the support body side. A force exerts on the other gear as a reaction force of the thrust. The exertion of this force moves the other gear, thereby enabling the frictional engagement section to be compressed, whereby the frictional engagement section can be frictionally engaged. Consequently, the frictional engagement section can be operated to perform secure frictional engagement.

In addition, the planetary carrier can be formed into a simple structure and can be formed even more compact.

According to a eleventh aspect of the present invention, the torque transmission coupling according to the eighth aspect, wherein the rotary actuator performs the rotational driving one of the pair gears; the other one of the pair gears is supported in the support body side to be non-rotatable; a cam mechanism is interposed between the support body and the planetary carrier; and engagement radii between the pair of individual gears and the planetary gear are different from each other.

Accordingly, when the one of the pair of gears is rotationally driven by the rotational driving of the rotary actuator, the planetary gear rotates between the pair of gears to perform a revolution. With the revolution, the planetary carrier is much decelerated to perform the relative rotation at a low velocity with respect to the other of the pair of gears. With the relative rotation, the cam mechanism generates thrust. The thrust is received in the support body side, and a force exerts on the planetary carrier as a reaction force of the thrust. The exertion of this force moves the planetary carrier, thereby enabling the frictional engagement section to be compressed. Accordingly, the frictional engagement section can be frictionally engaged. Consequently, the frictional engagement section can be operated to perform secure frictional engagement.

In addition, the one of the pair of gears can be integrally provided on the rotary actuator, and the other thereof can be integrally provided in the support body side. Thereby, the number of components can be reduced, and hence the construction can be formed even more compact.

According to a twelfth aspect of the present invention, the torque transmission coupling according to any one of the first, second, and seventh aspects, wherein the rotary actuator and the frictional engagement section are disposed with rotation axes thereof being aligned with each other.

Accordingly, the overall weight balance is excellent, so the vehicle-body vibrations and the like can be prevented.

According to a thirteenth aspect of the present invention, the torque transmission coupling according to the twelfth aspect, wherein a press member is provided between the frictional engagement section and the compression member set, receives the thrust from the compression member set to cause the frictional engagement.

Accordingly, preventing to increase a size in diametral direction can be accomplished. The press member can receive the thrust from the compression member set, and accurately and smoothly transmit the thrust to the frictional engagement section to cause the frictional engagement. Therefore, the frictional engagement can be easily and accurately controlled.

A fourteenth aspect of the present invention provides a torque transmission coupling comprises input-output rotary members rotatably supported to perform input-output transmission; a friction clutch provided between the input-output rotary members to perform torque transmission between the input-output rotary members in correspondence to an engagement force; a compression gear set that comprises a pair of gears capable of performing relative rotation and that generates thrust through the relative rotation between the gears to thereby cause the friction clutch to perform the frictional engagement; and a rotary actuator comprising a rotational driving shaft tiltedly disposed with respect to the direction along the rotation axis of the compression gear set, and a pair of driving gears fixed to the rotational driving shaft and individually engaged with the pair of gears; and engagement radii or speed reduction ratios of engagements between the pair of individual gears and the individual driving gears are different from each other.

Accordingly, the rotational driving shaft is rotated by driving of the rotary actuator, and the pair of gears co-rotates through the pair of driving gears. At this time, since the engagement radii or the speed reduction ratios are different from each other, the pair of gears co-rotates and performs the relative rotation. The relative rotation between the pair of gears causes the compression gear set to generate thrust. The thrust causes the friction engagement member to be engaged, thereby enabling the torque transmission between the input-output rotary members to be performed corresponding to the engagement force of the friction engagement member.

Since the rotational driving shaft of the rotary actuator is tiltedly disposed in the direction along the rotation axis of the compression gear set, the disposition and the tilt angle of the rotary actuator can be arbitrarily set, thereby enabling the degree of layout freedom to be enhanced.

With the enhanced degree of layout freedom, the portions of the driving gears can be positioned very close to the compression gear set with respect to the rotary actuator. As such, the compression gear set can be miniaturized, whereby the overall construction can be formed even more compact, and hence a weight reduction can be implemented.

Further, since the engagement radii or the speed reduction ratios set to be different from each other, the rotational driving of the rotary actuator can cause the pair of gears to perform the relative rotation to be much decelerated. Thereby, the rotary actuator and the compression gear set can be formed compact, and a weight reduction also can be implemented.

According to a fifteenth aspect of the present invention, the torque transmission coupling according to the fourteenth aspect, wherein the compression gear set comprises a cam mechanism disposed between the gears that causes the thrust to be generated by enforcing the relative rotation.

Accordingly, the thrust for engaging the friction clutch through the relative rotation of the pair of gears can be securely generated.

According to a sixteenth aspect of the present invention, the torque transmission coupling according to the fourteenth aspect, wherein of one of the gears is supported a rear thereof in a support body side in the direction along the rotation axis; the other of the gears opposes the side of the friction engagement member; and the engagement is performed by moving the other gear toward the friction engagement member according to the thrust and supporting the one of the pair of gears in the support body.

Accordingly, the thrust of the compression gear set is transmitted from the one gear to the support body side, and a reaction force thereof is transmitted to the other gear, thereby enabling the friction clutch to be securely engaged.

According to a seventeenth aspect of the present invention, the torque transmission coupling according to the fourteenth aspect, wherein at least one of the pair of gears and the pair of driving gears is formed of face gears; and the engagement radii of the pair of gears and the driving gears are different from each other.

Accordingly, the rotational driving shaft of the rotary actuator can easily be tiltedly disposed in the direction along the rotation axis of the compression gear set.

According to a eighteenth aspect of the present invention, the torque transmission coupling according to the fourteenth aspect, wherein the pair of gears and the pair of driving gears are formed of crossed gears and bevel gears; and speed reduction ratios of the pair of gears and the pair of driving gears are different from each other.

Accordingly, the rotational driving shaft of the rotary actuator can easily be tiltedly disposed in the direction along the rotation axis of the compression gear set.

According to a nineteenth aspect of the present invention, the torque transmission coupling according to the fourteenth aspect, wherein one of the input-output rotary members is a clutch housing, and the other thereof is a clutch hub disposed on an inner circumference side of the clutch housing; a friction clutch is provided between the clutch housing and the clutch hub; an compression member opposing the friction clutch in the direction along the rotation axis is disposed in an end portion between the clutch housing and the clutch hub; and the compression member is compressed by the thrust of the compression gear set.

Accordingly, the friction clutch can be securely engaged. The engagement of the friction clutch enables the torque transmission to be securely performed between the clutch housing and the clutch hub.

According to a twentieth aspect of the present invention, the torque transmission coupling according to any one of the first, second, seventh, and fourteenth aspects, wherein the torque transmission coupling is disposed to any one of an output side of a transfer device, an input side to a rear differential, a propeller shaft between the transfer device and the rear differential, a front-wheel side acceleration shaft, and rear-wheel side acceleration shaft of a four-wheel drive vehicle.

Accordingly, the torque transmission can be accurately implemented through any one of the torque transmission couplings.

DETAILED DESCRIPTION OF THE EMBODIMENTS

Figure 1:
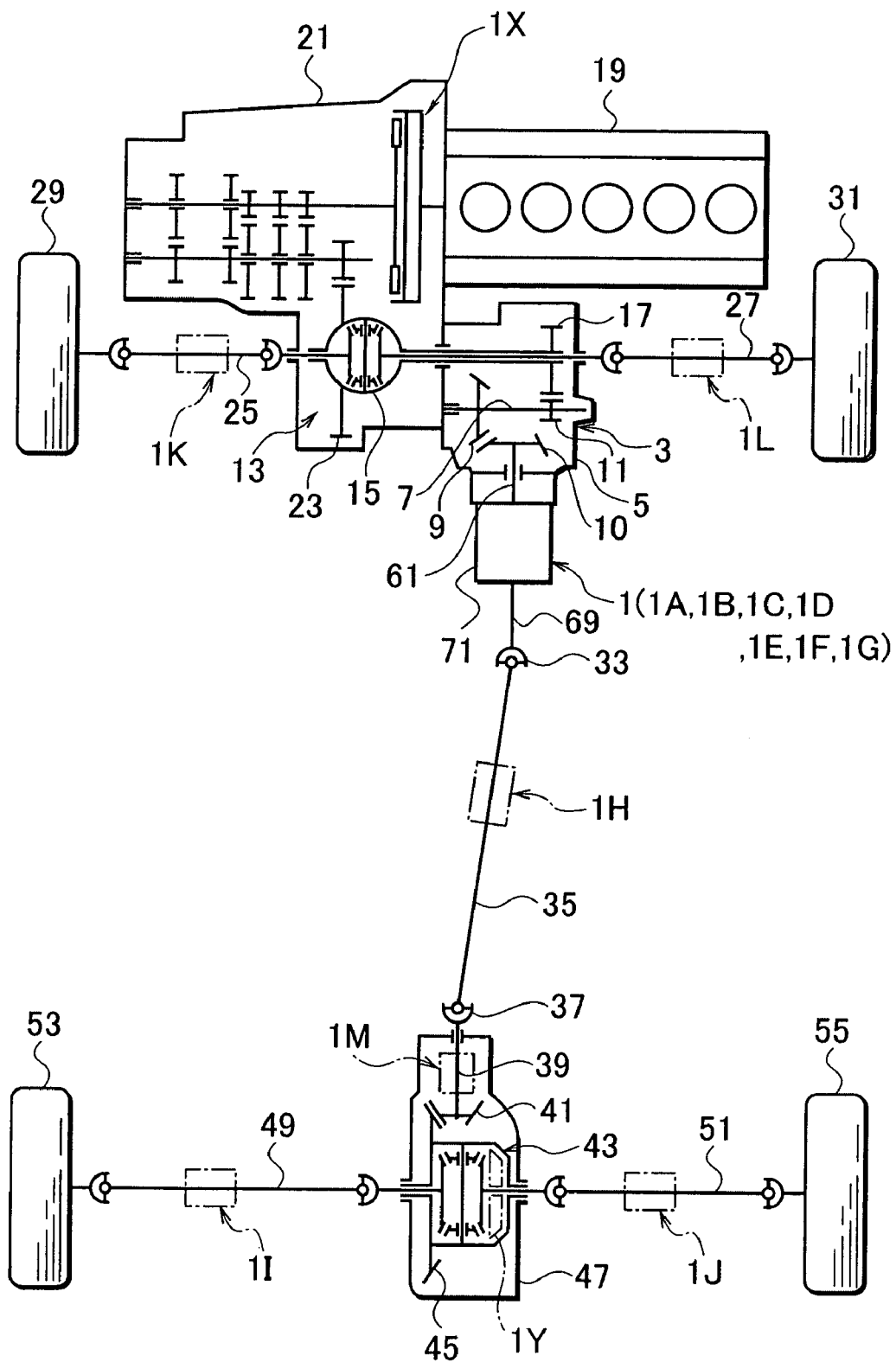
FIG. 1 is a skeleton plan view of a four-wheel drive vehicle (4WD vehicle), showing a disposition of a torque transmission coupling according to a first embodiment of the present invention.

FIG. 1 is a skeleton plan view of a four-wheel drive vehicle (4WD vehicle), showing a disposition of a torque transmission coupling according to a first embodiment of the present invention.

A torque transmission coupling 1 has a coupling housing 71. The coupling housing 71 is mounted to a transfer case 5 on a rear output side of a transfer device 3. The transfer case 5 is mounted on the side of a vehicle body, and therefore serves as a support body side. A transmission shaft 7 is supported to be rotatable in the transfer case 5. The transmission shaft 7 has a bevel gear 9 and a spur gear 11. The bevel gear 9 engages a pinion gear 10 provided integrally with an output shaft 61 of the transfer device 3. The spur gear 11 engages a spur gear 17. The spur gear 17 is co-rotatably connected with a differential casing 15 of a front differential 13.

The front differential 13 has a ring gear 23. The ring gear 23 is input torque from an engine 19 through a transmission 21. Left and right front wheels 29 and 31 are co-rotatably coupled to the front differential 13 through left and right acceleration shafts 25 and 27, respectively.

The torque transmission coupling 1 has an output shaft 69. The output shaft 69 is coupled to a propeller shaft 35 through a constant-velocity universal joint 33. The propeller shaft 35 is coupled to a drive pinion shaft 39 through a constant-velocity universal joint 37. The drive pinion shaft 39 has a drive pinion gear 41. The drive pinion gear 41 engages a ring gear 45 of a rear differential 43. The rear differential 43 is rotatably supported by a differential carrier 47, and is co-rotatably coupled to left and right rear wheels 53 and 55 through a left and right acceleration shafts 49 and 51.

As such is the construction, when torque is input to the ring gear 23 of the front differential 13 from the engine 19 through the transmission 21, the torque is transmitted to the left and right front wheels 29 and 31 through the respective acceleration shafts 25 and 27. On the other hand, the torque is transmitted to the torque transmission coupling 1 through the differential casing 15, the spur gears 17 and 11, the transmission shaft 7, the bevel gear 9, the pinion gear 10, and the output shaft 61.

The torque is transmitted from the torque transmission coupling 1 to the ring gear 45 of the rear differential 43 through the output shaft 69, the constant-velocity universal joint 33, the propeller shaft 35, the constant-velocity universal joint 37, the drive pinion shaft 39, and drive pinion gear 41. In addition, the torque is transmitted from the rear differential 43 to the left and right rear wheels 53 and 55 through the respective the acceleration shafts 49 and 51.

Accordingly, when the torque transmission coupling 1 is in the state of torque transmission, the front wheels 29 and 31 and the rear wheels 53 and 55 rotate and thereby enable the vehicle to travel in a four-wheel drive (4WD) state. When the torque transmission coupling 1 is not in a torque transmission state, the vehicle is enabled to travel in a 2-wheel drive (2WD) state with the front wheels 29 and 31 being driven.

Figure 2:
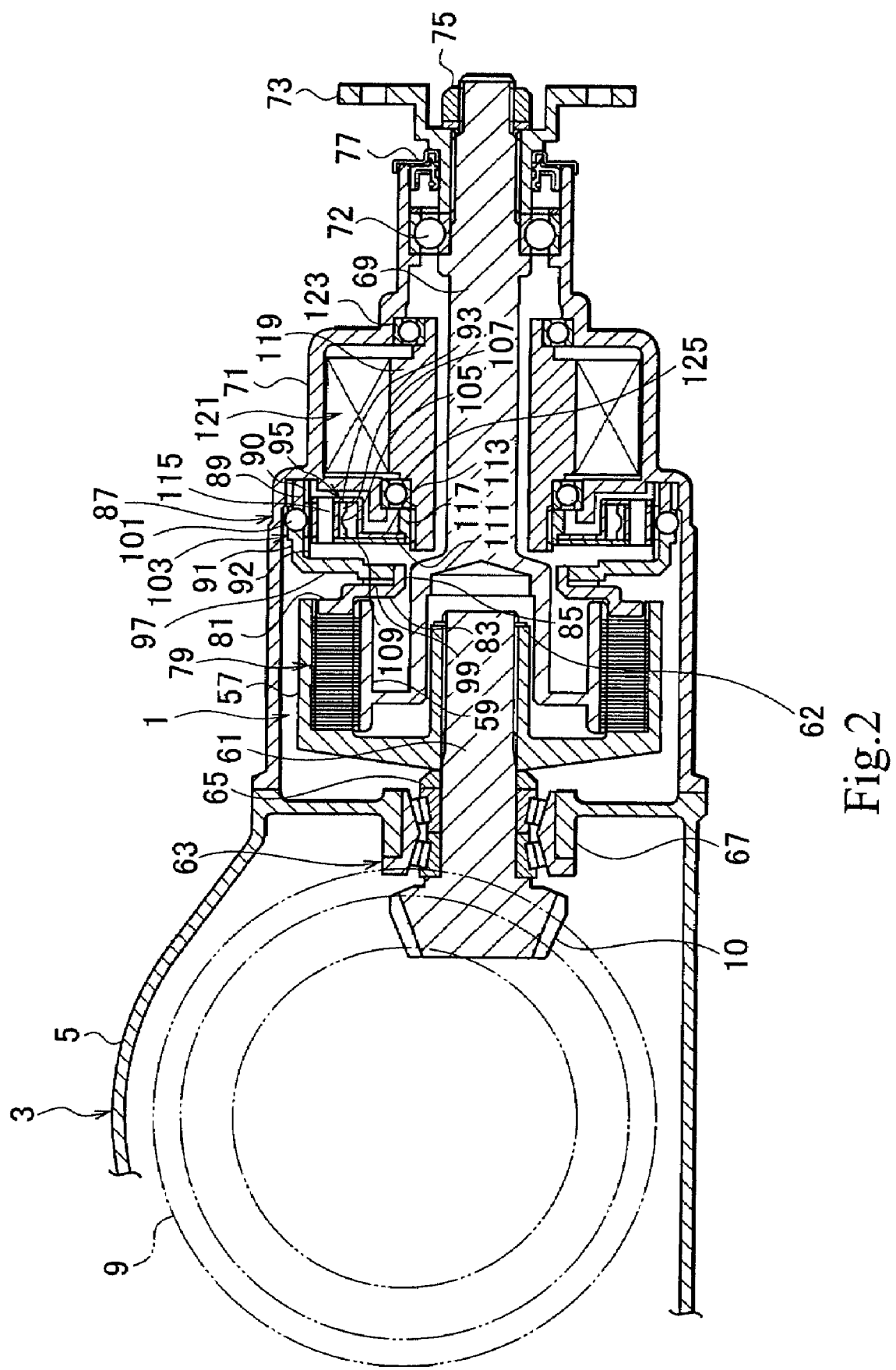
FIG. 2 is a vertical sectional view of the torque transmission coupling and peripheral portions thereof according to the first embodiment.

In more detail, the torque transmission coupling 1 is constructed as shown in FIG. 2. FIG. 2 is a vertical sectional view of the torque transmission coupling 1 and peripheral portions thereof.

The torque transmission coupling 1 has a clutch housing 57 and a clutch hub 59. According to the present embodiment, the clutch housing 57 serves as an input rotary member, and engages the output shaft 61 of the transfer device 3 in splined relation. A snap ring 62 is mounted on the output shaft 61. A unit bearing 63 is mounted on the output shaft 61 and fixed with a nut 65. The clutch housing 57 is positioned to the output shaft 61 between the snap ring 62 and the nut 65 in an axial position. The unit bearing 63 is mounted to a support portion 67 of the transfer case 5 by, for example, bolt fastening to be removably attachable.

In the present embodiment, the clutch hub 59 serves as an output rotary member and is formed integrally with the output shaft 69. The output shaft 69 is rotatably supported by the housing 71 serving as the support body side together with the transfer case 5 through a bearing 72. The housing 71 is fastened to the transfer case 5 by means of, for example, bolts and nuts.

A coupling flange 73 spline-engages an outer edge portion of the output shaft 69. The coupling flange 73 is fastened to the output shaft 69 by a nut 75 to prevent a fallout. A seal 77 is provided between the coupling flange 73 and the housing 71. The coupling flange 73 is coupled to the constant-velocity universal joint 33.

A frictional multiplate clutch 79 serving as a frictional engagement section is provided between the clutch housing 57 and the clutch hub 59. The frictional multiplate clutch 79 has outer plates and inner plates. The outer plates engage the clutch housing 57, and inner plates engage the clutch hub 59. As such, frictional engagements of the frictional multiplate clutch 79 enables torque transmission between the clutch housing 57 and the clutch hub 59.

A press member 81 is disposed in opposition to an end portion between the clutch housing 57 and the clutch hub 59. A pressure reception section 83 is integrally provided on an inner circumference of the press member 81. A support boss section 85 is circumferentially provided on an inner circumference of the pressure reception section 83.

A compression gear set 87 serving as compression member set is provided adjacent the press member 81. The compression gear set 87 has a pair of gears 89 and 91, which serves as a pair of members capable of performing relative rotation, a planetary gear 93 that engages gears 89 and 91, and a planetary carrier 95 that supports the planetary gear 93.

In the present invention, any of the pair of gears 89 and 91, the planetary gear 93, and the planetary carrier 95 are supported by the housing 71, other one thereof is rotationally driven, and the other one thereof is relatively rotated. Thereby, an input generated by the rotational driving is converted into a compression force in the direction along the rotation axis whereby to cause the frictional engagement of the frictional multiplate clutch 79.

In the present invention, the gear 89, which is one of the pair of gears, is non-rotatably supported to the housing 71. That is, the gear 89 is formed to be ring-shaped, and an outer circumferential surface thereof is non-rotatably spline-engaged with an inner circumferential surface of the housing 71. In this construction, a rear surface of the gear 89 meets the housing 71 in the direction along the rotation axis. Therefore, the gear 89 is supported in the support body side along the rotation axis.

The gear 91 is supported relatively rotatable with respect to the gear 89. A compression section 97 is integrally provided with the gear 91 to be radially rotational. The compression section 97 is supported relatively rotatable around the outer circumferential surface of the support boss section 85. A needle bearing 99 is interposed between the compression section 97 and the pressure reception section 83.

A cam mechanism 103 having a ball 101 is provided between the pair of gears 89 and 91. The ball 101 is disposed in opposition to cam surfaces that are individually formed on the gears 89 and 91. Teeth portions 90 and 92 are provided to the inner circumferential surfaces of the respective gears 89 and 91. The teeth portion 90 and the teeth portion 92 are slightly different from each other in the number of teeth.

The planetary gear 93 has radially rotational concave portion 105. The planetary gear 93 has front and rear teeth portions 107 and 109 provided along the rotation axis through the concave portion 105 sandwiched therebetween. The teeth portion 107 on the one side engages the teeth portion 90 of the gear 89, and the teeth portion 109 on the other side engages the teeth portion 92 of the gear 91 on the other side. The concave portion 105 is disposed not to in contact with the ball 101.

The gear ratios between the gear 89 and the planetary gear 93 and between the gear 91 and the planetary gear 93 are designed to be slightly different from each other corresponding to the different numbers of teeth of the teeth portion 90 and the teeth portion 92.

The planetary gear 93 is supported by the planetary carrier 95, and is rotatable. The planetary carrier 95 has carrier plates 111 and 113. A carrier pin 115 is provided to the carrier plates 111 and 113. The planetary gear 93 is supported by the carrier pin 115 to be rotatable.

The carrier plates 111 and 113 are fixed to the outer circumferential side of a ring 117 by, for example, being welded. The ring 117 is spline-engaged to an end portion of a hollow rotary driving shaft 119. The rotary driving shaft 119 is an output shaft of an electric motor 121 serving as a rotary actuator. The rotary driving shaft 119 is rotatably supported to the housing 71 by sealed bearings 123 and 125.

Thereby, the electric motor 121 and the frictional multiplate clutch 79 are disposed in axial alignment with each other. The electric motor 121 is incorporated into a inside of the housing 71, thereby is stably supported.

As such is the construction, the electric motor 121 forms a hermetic spacing with the housing 71, the rotary driving shaft 119 serving as the output shaft and the sealed bearings 123 and 125 disposed therebetween. The housing 71 has a breather (not shown).

When the frictional multiplate clutch 79 is not in engagement, the clutch housing 57 and the clutch hub 59 rotate relative to each other. As such, even when torque transmitted from the engine 19 side to the pinion gear 10 is input to the clutch housing 57 through the output shaft 61, the torque is not transmitted to the clutch hub 59 side. Consequently, the torque transmission coupling 1 is in the state of nontransmission of the torque, so that the vehicle is enabled to travel in the 2WD state with front wheels 29 and 31 being driven, as described above.

Upon rotational driving of the electric motor 121, torque of the electric motor 121 is transmitted to the ring 117 through the rotary driving shaft 119, whereby the planetary carrier 95 is integrally rotated. Upon the rotation of the planetary carrier 95, the planetary gear 93 starts revolution with the rotation axis of the rotary driving shaft 119 being in the center through the carrier pin 115. With the revolution of the planetary gear 95, the planetary gear 93 rotates in engagement with the gears 89 and 91, and then rotates on its axis.

In this construction, the gear ratio between the gear 89 and the planetary gear 93 is slightly different from the gear ratio between the gear 91 and the planetary gear 93, and the gear 89 is supported non-rotatable with respect to the housing 71. Accordingly, the gear 91 performs relative rotation at a low velocity with respect to the gear 89. With the relative rotation, a rotation delivered from the rotary driving shaft 119 to the gear 91 is much decelerated. This relative rotation causes the cam surfaces of the gears 89 and 91 to ride over the ball 101, and the cam mechanism 103 then generates thrust.

While the thrust is acting, the gear 89 on the one side is received by the wall of the housing 71, whereby a force as a reaction force of the thrust exerts on the gear 91. The exertion of the force moves the gear 91, whereby the compression section 97 integral with the gear 91 compresses the pressure reception section 83 through the needle bearing 99 in the direction along the rotation axis.

In response to the compression, the press member 81 receives the thrust as a compression force, and moves along the same direction to cause engagement of the frictional multiplate clutch 79 between the press member 81 and the clutch housing 57. The frictional multiplate clutch 79 exhibits a frictional engagement force corresponding to the compression force of the press member 81 to thereby cause torque transmission between the clutch housing 57 and the clutch hub 59.

According to the above operations, the torque transmitted from the output shaft 61 of the transfer device 3 is transmitted from the clutch housing 57 to the clutch hub 59 through the frictional multiplate clutch 79. Consequently, the torque is transmitted from the clutch hub 59 to the output shaft 69, and the torque is then output from the output shaft 69 to the rear wheels 53 and 55 mentioned above. This enables traveling in the 4WD state with front wheels 29 and 31 and the rear wheels 53 and 55 being driven.

A rotation delivered from the rotary driving shaft 119 to the gear 91 is much decelerated by the relative rotation of the gear 91 with respect to the gear 89 with the planetary gear 93 so that the frictional multiplate clutch 79 can be formed to securely perform the engagement as miniaturizing and compactly building the electric motor 121.

Since the electric motor 121 can be miniaturized and the construction can be built compact, a weight reduction of the torque transmission coupling 1 can be implemented. By implementing the overall miniaturization, it can very easily be disposed in a narrow spacing such as that of transfer.

By adjusting driving-force of the electric motor 121, the compression force of the frictional multiplate clutch 79 can be adjusted, and the torque transmission to sides of the rear wheels 53 and 55 can be accurately adjusted. In this case, the rotation to be delivered from the rotary driving shaft 119 to the gear 91 is much decelerated by the rerative rotation of the gear 91 with respect to the gear 89 with the planetary gear 93. As such, the gear 91 rotates relative to the gear 89 at a very low velocity with respect to the rotational driving of the electric motor 121, thereby enabling to be accurate and easy to adjust the frictional engagement of the frictional multiplate clutch. Consequently, torque adjustment can be implemented arbitrarily and easily corresponding to automobile travel conditions such as those of take-off traveling, cornering traveling, on-rough-road traveling, and off-road traveling.

As described above, according to the present embodiment, the thrust generated through the compression gear set 87 can securely be received on the wall in the housing 71 without requiring special members, and the reaction force of the thrust can securely be transmitted to exert on the gear 91. More specifically, since special members are not required to receive the thrust, the engagement can be caused sufficient for the frictional engagement of the frictional multiplate clutch 79. In addition, the structure can prevent the increase of the weight, and can be disposed even in a narrow spacing without requiring unreasonable difficulty.

According to this embodiment, since the press member 81 is provided between the frictional multiplate clutch 79 and the compression gear set 87, the torque transmission coupling 1 can be prevented to increase a size in diametral direction of the circumference thereof.

In addition, the press member 81, the frictional multiplate clutch 79 and the compression gear set 87 are straightly arranged with each other. Namely, the press member 81 can receive the thrust from the compression gear set 87, and can accurately and smoothly transmit the thrust as the compression force to the frictional multiplate clutch 79 to cause the frictional engagement. Therefore, the frictional engagement can be easily and accurately controlled.

Figure 3:
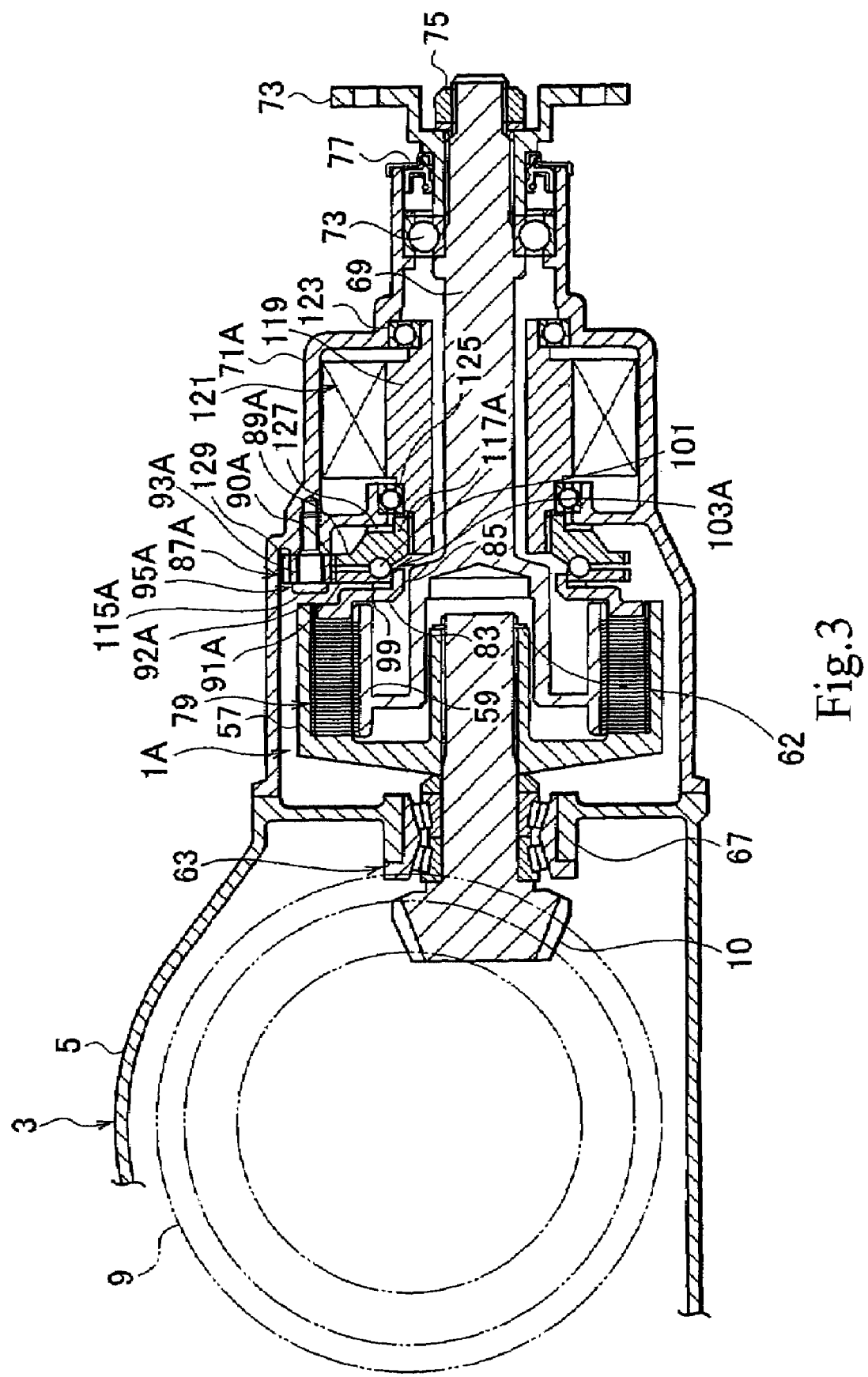
FIG. 3 is a vertical sectional view of a torque transmission coupling and peripheral portions thereof according to a second embodiment.

FIG. 3 is a vertical sectional view of a torque transmission coupling 1A and peripheral portions thereof according to a second embodiment. The basic construction is similar to that of the first embodiment, and description will be made using the like numerals for construction portions corresponding to those in the first embodiment.

In the torque transmission coupling 1A of the present embodiment, a gear 89A of a compression gear set 87A is formed integrally with a ring 117A. A needle bearing 127 is provided between the gear 89A and housing 71A. As such, in this construction, the gear 89A, which is one of a pair of gears (89A and 91A), is supported to the housing 71A in the direction along the rotation axis.

The gear 89A and the gear 91A are disposed along the rotation axis. A cam mechanism 103A having a ball 101 is interposed between the pair of gears 89A and 91A. Teeth portions 90A and 92A of the respective gears 89A and 91A are formed to be slightly different from each other in the number of teeth, and engage a teeth portion 129 of a planetary gear 93A.

A planetary carrier 95A is constructed of a carrier pin 115A and the housing 71A. The carrier pin 115A is fixed with screw to the housing 71A. Thereby, the planetary carrier 95A is non-rotatably constructed in the support body side. The planetary gear 93A is rotationally supported between the carrier pin 115A and the housing 71A. A plurality of planetary gears 93A, each being supported by the carrier pin 115A, are provided in the circumferential direction of the gears 89A and 91A at predetermined intervals.

Upon rotational driving of the electric motor 121, the gear 89A on the one side is integrally rotationally driven with the rotary driving shaft 119. When the gear 89A is rotationally driven, the planetary gear 93A engaged therewith starts rotation, and the gear 91A engaged with the planetary gear 93A co-rotates therewith. That is, the gear 89A and the gear 91A rotate together.

The gear ratio between the planetary gear 93A and the gear 89A is set to slightly be different from the gear ratio between the planetary gear 93A and the gear 91A as described above. Accordingly, while rotating with the gear 89A, the gear 91A performs relative rotation at a low velocity with respect to the gear 89A. This relative rotation causes the cam mechanism 103A to serve similar to the above and then generates thrust.

The gear 89A on the one side upon which the thrust exerts is received in the housing 71A through the needle bearing 127. Thereby, a force as a reaction force of the thrust exerts on the gear 91A, and the exertion of the force moves the gear 91A toward the pressure reception section 83. This movement enables the frictional engagement of the frictional multiplate clutch 79 with the press member 81, as in the case described above.

Consequently, also in the present embodiment, substantially the same operational effects as those in the first embodiment can be exhibited.

In addition, the planetary carrier 95A can be constructed of the carrier pins 115A and the housing 71 to be simple and the overall construction can be built compact. Further, a weight reduction of the torque transmission coupling 1A can be implemented.

Figure 4:
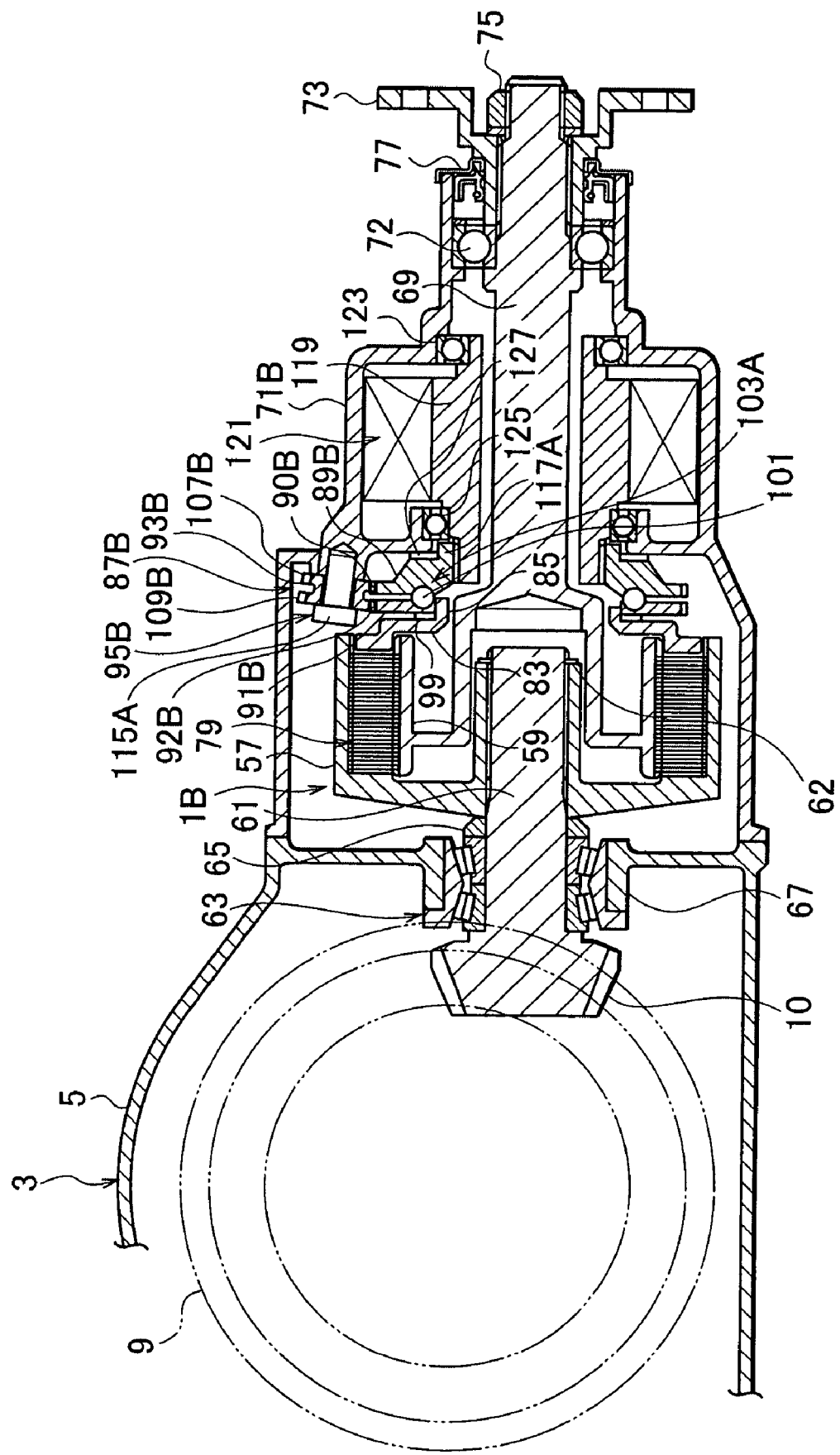
FIG. 4 is a vertical sectional view of a torque transmission coupling and peripheral portions thereof according to a third embodiment.

FIG. 4 is a vertical sectional view of a torque transmission coupling 1B and peripheral portions thereof according to a third embodiment. The present embodiment has a basic construction similar to that of the second embodiment, and description will be made using the like numerals for construction portions corresponding to those in the second embodiment.

In the torque transmission coupling 1B, the same number of teeth is set for a teeth portion 90B and a teeth portion 92B of a respective gear 89B and the gear 91B of a compression gear set 87B. Teeth portions 107B and 109B of a planetary gear 93B are each formed of a face gear, for example. The outer circumferential diameter of the teeth portion 109B is set larger than the outer circumferential diameter of the teeth portion 107B.

A carrier pin 115A of a planetary carrier 95B is screw-fixed with a tilt to housing 71B. In this state, the teeth portions 107B and 109B of the planetary gear 93B engage the teeth portion 90B and the teeth portion 92B, respectively.

Accordingly, in the present embodiment, the engagement radii between the pair of gears 89B and 91B and the planetary gear 93B are set differently from each other.

Effects of the present embodiment are substantially the same as those of the second embodiment. More specifically, when the gear 89B is rotationally driven, the planetary gear 93B starts rotation, and the gear 91B co-rotates with the gear 89A and concurrently performs rotation relative to the gear 89B at a low speed in accordance with the difference between the engagement radii. Thereby, the frictional engagement of the frictional multiplate clutch 79 is established in a manner similar to that described above. Consequently, in the present embodiment also, substantially the same operational effects as those in the second embodiment can be exhibited.

Figure 5:
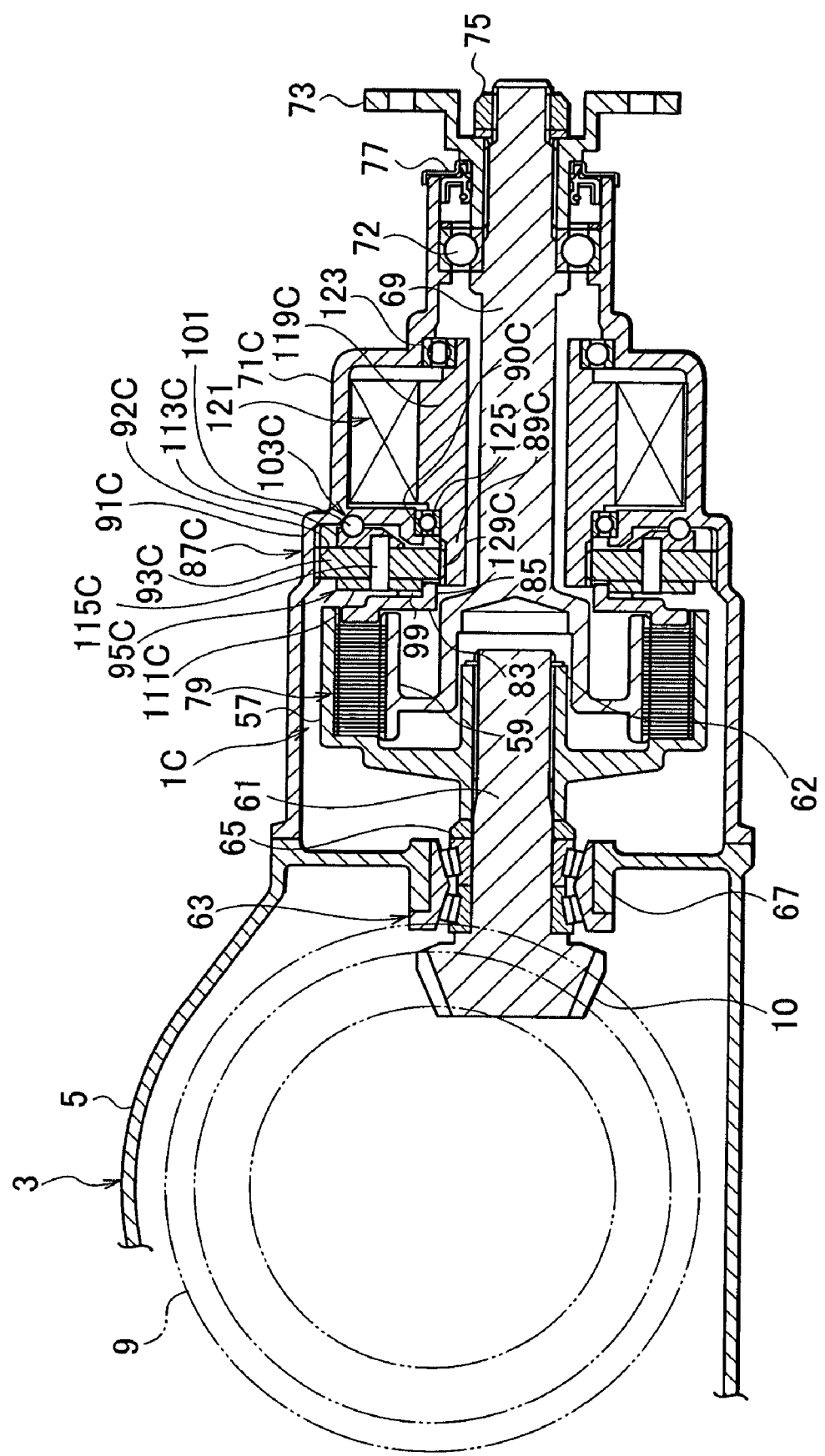
FIG. 5 is a vertical sectional view of a torque transmission coupling and peripheral portions thereof according to a fourth embodiment.

FIG. 5 is a vertical sectional view of a torque transmission coupling 1C and peripheral portions thereof according to a fourth embodiment. The present embodiment has a basic construction similar to that of the first embodiment, and description will be made using the like numerals for construction portions corresponding to those in the first embodiment.

In the torque transmission coupling 1C of the present embodiment, one gear 89C of a compression gear set 87C is integrally provided to an end portion of a rotary driving shaft 119C. That is, in the construction, an electric motor 121 rotationally drives one gear 89C of a pair of gears 89C and 91C.

The other gear 91C of the pair of gears, the gear 91C, is integrally provided in housing 71C, and is non-rotatably supported in the support body side.

A planetary carrier 95C has carrier plates 111C and 113C. A carrier pin 115C is fixed to the carrier plates 111C and 113C. A planetary gear 93C is rotatably supported on the carrier pin 115C.

A cam mechanism 103C having a ball 101 is provided between the housing 71C and the carrier plate 113C. The ball 101 is disposed in opposition to a cam surface formed on an inner wall of the housing 71C and a cam surface formed on a sidewall of the carrier plate 113C.

As described above, the gear 91C is integrally formed in the housing 71C, and the carrier plate 113C is interposed between the housing 71C and the carrier plate 113C. The construction is thus built such that the cam mechanism 103C is interposed between the other gear 91C of the pair of gears and a planetary carrier 95C.

The pitch of respective teeth portions 90C and 92C of the pair of gears 89C and 91C are set differently from each other; more specifically, the pitch of the teeth portion 92C is set larger. When a teeth portion 129C of the planetary gear 93C is engaged with the teeth portions 90C and 92C, the engagement radii between the pair of gears 89C and 91C and the planetary gear 93C are different from each other.

Upon rotational driving of the electric motor 121, the gear 89C is integrally rotationally driven. With the gear 89C being rotationally driven, the planetary gear 93C starts rotation in engagement with the pair of gears 89C and 91C. At this time, since the engagement radii between the pair of gears 89C and 91C and the planetary gear 93C are different from each other, the planetary gear 93C revolves at a low speed with the rotation axis of the rotary driving shaft 119C being in the center. With the revolution, the planetary carrier 95C rotate relative to the housing 71C on the gear 91C through the carrier pin 115C at a low velocity. Thus, the rotational driving of the electric motor 121 is much decelerated. This relative rotation drives the cam mechanism 103C whereby to generate thrust. The thrust is then received in the housing 71C, whereby a force as a reaction force of the thrust exerts on the carrier plate 113C. This force is transmitted to the carrier plate 111C through the carrier pin 115C, the planetary carrier 95C is thereby moved overall toward the press member 81. The movement of the press member 81 enables the engagement of the frictional multiplate clutch 79.

Consequently, the present embodiment is enabled to exhibit substantially the same operational effects as the first embodiment.

In addition, the gear 89C is integrally provided with the electric motor 121, and the gear 91C is integrally provided with the housing 71C, so that the number of components can be reduced whereby to enable the construction to be formed more compact.

Figure 6:
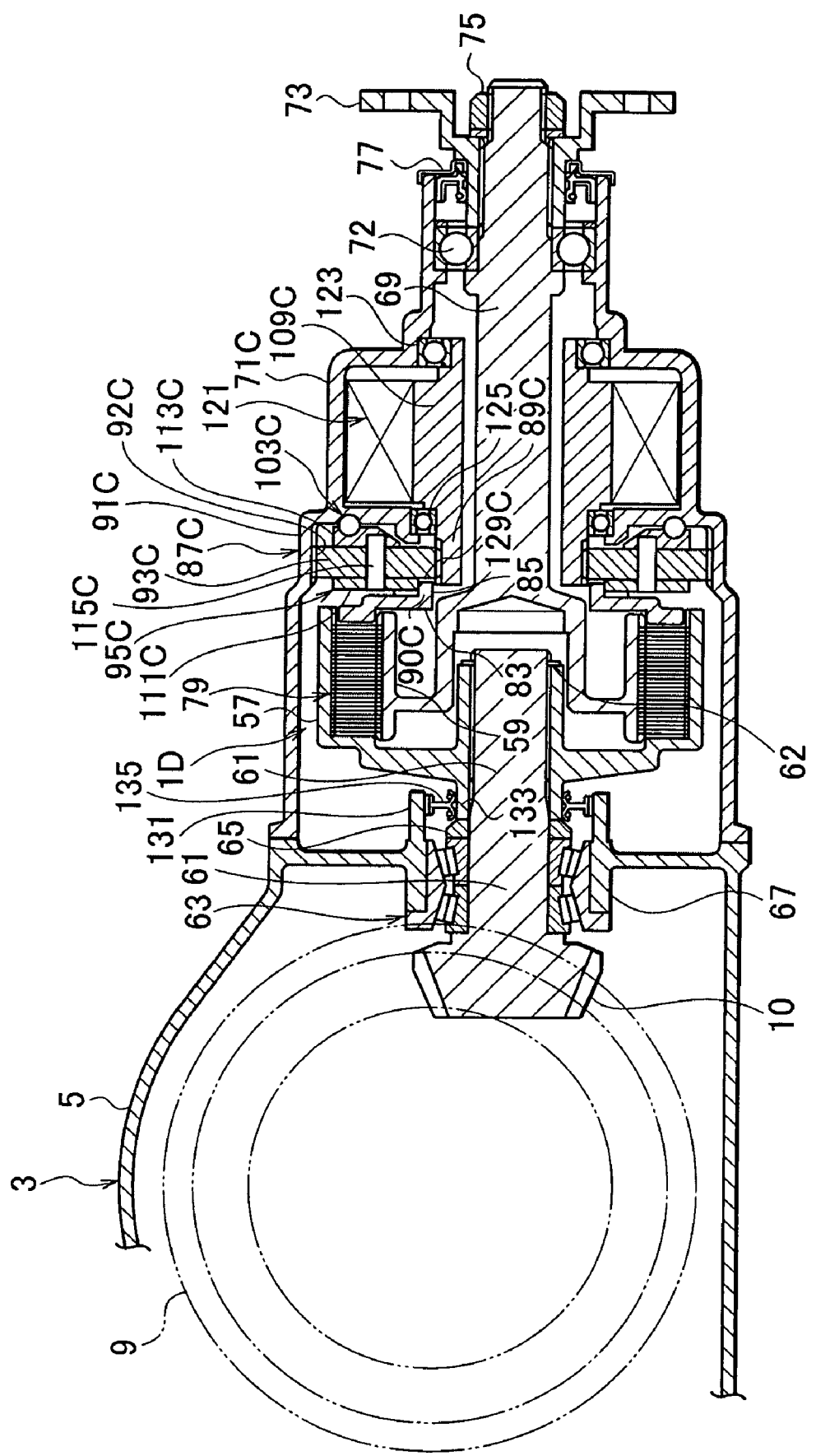
FIG. 6 is a vertical sectional view of a torque transmission coupling and peripheral portions thereof according to a modified embodiment of the fourth embodiment.

FIG. 6 is a vertical sectional view of a torque transmission coupling 1D and peripheral portions thereof according to a modified embodiment of the forth embodiment.

In the torque transmission coupling 1D, the basic construction of the fourth embodiment is arranged such that a sleeve 131 protruding into the housing 71C is provided in the transfer case 5, and a seal 135 is interposed between the sleeve 131 and a boss portion 133 of the clutch housing 57.

As such, in the present embodiment, the seal 135 can seal between the transfer case 5 and the housing 71C, and appropriate types of lubricating oil can be individually used in the transfer device 3 and the torque transmission coupling 1D.

The input/output relationship can be arbitrarily set, and the construction may be such that the clutch housing 57 is used as an output member and the clutch hub 59 is used as an input member.

Figure 7:
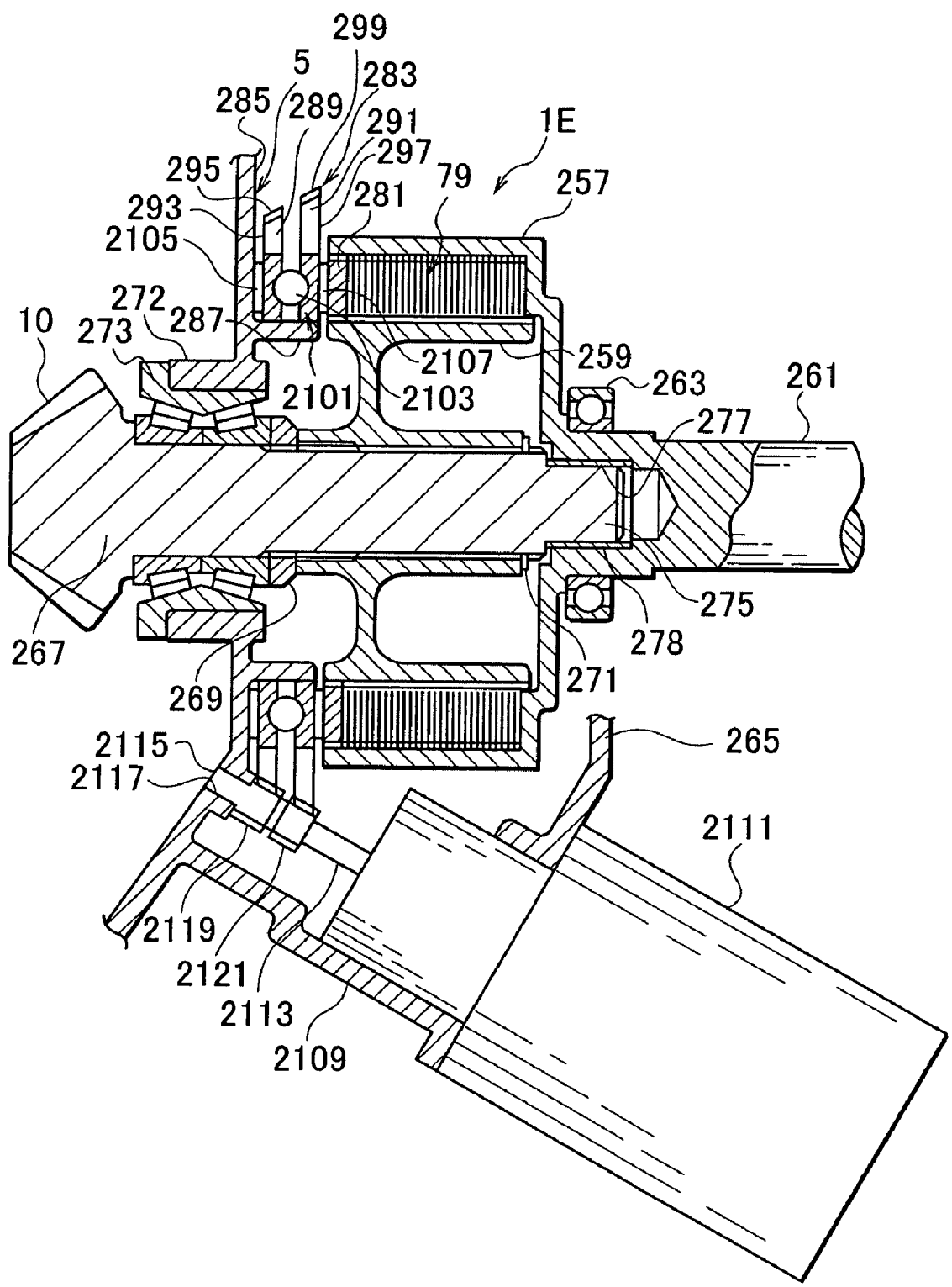
FIG. 7 is a vertical sectional view of a torque transmission coupling and peripheral portions thereof according to a fifth embodiment.

FIG. 7 is a vertical sectional view of a torque transmission coupling 1E and peripheral portions thereof according to a fifth embodiment. As in the first embodiment, the basic construction is the same as that shown in the skeleton view of FIG. 1, and description will be made using the like reference numerals for construction portion corresponding to those in the fifth embodiment. In the present embodiment, a torque transmission coupling 1E is used to replace the torque transmission coupling 1 of the first embodiment, an output shaft 267 is used to replace the output shaft 61 of the first embodiment, an output shaft 261 to replace the output shaft 69 of the first embodiment, and a coupling housing 265 is used to replace the housing 71 of the first embodiment.

A clutch housing 257 serves as an output member, and is formed integrally with the output shaft 261. The output shaft 261 is rotatably supported to the coupling housing 265 through a bearing 263, or the like. The coupling housing 265 is mounted removably attachable to the transfer case 5 by using, for example, bolts and nuts.

In the present embodiment, a clutch hub 259 serves as an input member, and is disposed on an inner circumference side of the clutch housing 257. The clutch hub 259 spline-engages the output shaft 267 having the pinion gear 10. One side of the clutch hub 259 meets a nut 269, and the other side thereof is positioned by a snap ring 271.

The nut 269 tightens a unit bearing 273 to the output shaft 267 whereby to provide a preload. The unit bearing 273 is mounted to a boss portion 272 of the transfer case 5. An end portion 275 of the output shaft 267 is inserted into and rotatably supported by a support bore 277 through a metal bearing 278, in which the support bore 277 is formed in an end portion of the output shaft 261 that outputs the torque to the rear wheel side.

Accordingly, the clutch hub 259 is rotatably supported by the transfer case 5 (support body side) through the output shaft 267 and the unit bearing 273. Concurrently, the clutch hub 259 is rotatably supported to the housing 265 through the end portion 275, the support bore 277, the output shaft 261, and the bearing 263.

A frictional multiplate clutch 79 serving as a friction clutch is provided between the clutch housing 257 and the clutch hub 259.

A press member 281 is provided in an end portion between the clutch housing 257 and the clutch hub 259. The press member 281 is formed in a ring shape, and is disposed in an end portion of the frictional multiplate clutch 79 to oppose in the direction along the rotation axis. The press member 281 spline-engages the clutch housing 257 and the clutch hub 259. As such, in the construction, the press member 281 is provided on the frictional multiplate clutch 79 side, compresses the frictional multiplate clutch 79 to perform a frictional engagement by moving toward the friction multiplate clutch 79.

A compression gear set 283 is provided between the press member 281 and the transfer case 5. The compression gear set 283 has a pair of gears relatively rotatable, and is used to generate thrust through relative rotation between the gears whereby to engage the frictional multiplate clutch 79.

The compression gear set 283 is disposed on an outer circumferential surface of a support cylinder portion 287. The support cylinder portion 287 is provided on an outer surface 285 of the transfer case 5 to be radially rotational on an outer circumferential side outwardly of the boss portion 272. With the support cylinder portion 287 and the outer surface 285, a support portion for supporting the compression gear set 283 is constructed. Specifically, the compression gear set 283 is engageably supported on an outer circumference of the support cylinder portion 287, and is disposed in opposition to the outer surface 285 and the press member 281.

The compression gear set 283 has a base gear 289 and a movable gear 291 serving as the pair of gears described above. The base gear 289 and the movable gear 291 are rotatably supported on an outer circumferential surface of the support cylinder portion 287.

The base gear 289 is constructed such that a rear surface thereof is supported to the outer surface 285 of the transfer 5 in the direction along the rotation axis through a needle bearing 2105. The movable gear 291 is disposed in opposition to the press member 281 through a needle bearing 2107.

The base gear, 289 has a base gear plate 293 and a face gear 295 is provided on an outer circumference of the base gear plate 293. The movable gear 291 has a movable gear plate 297 and a face gear 299 is provided on an outer circumference of the movable gear plate 297.

The base gear 289 and the movable gear 291 are formed to individually have outer circumferential diameters different from each other. In the present embodiment, the movable gear 291 is larger in the outer circumferential diameter than the base gear 289. However, the collating relationship between the diameters may be set in reverse between the base gear 289 and the movable gear 291.

A cam mechanism 2101 is provided between the base gear 289 and the movable gear 291. The cam mechanism 2101 has a ball 2103. The ball 2103 is interposed between cam surfaces formed on the base gear plate 293 and the movable gear plate 297. As such, in this construction, the base gear 289 and the movable gear 291 rotate relative to each other, the cam surfaces rides over the ball 2103, whereby thrust is generated between the base gear 289 and the movable gear 291.

An actuator support portion 2109 is provided with the transfer case 5. An electric motor 2111 serving as a rotary actuator is supported and fixed to the actuator support portion 2109. A rotational driving shaft 2113 of the electric motor 2111 is disposed with a tilt with respect to the direction along the rotation axis of the compression gear set 283.

A front end 2115 of the rotational driving shaft 2113 is rotatably supported in a support hole 2117 formed in the transfer case 5. A base-side driving gear 2119 and a movable-side driving gear 2121 as a pair of driving gears are fixedly provided with the rotational driving shaft 2113. The base-side driving gear 2119 and the movable-side driving gear 2121 are individually formed of spur gears having the same diameters and attributes.

The base-side driving gear 2119 and the movable-side driving gear 2121 tiltedly engage the face gears 295 and 299, respectively. These engagements can be enabled by the face gears 295 and 299.

In the individual engagements between the pair of gears and the driving gears, the engagement radii are different from each other. More specifically, the engagement radius between the base gear 289 and the base-side driving gear 2119 is set relatively smaller, and the engagement radius between the movable gear 291 and the movable-side driving gear 2121 is set relatively larger.

When the frictional multiplate clutch 79 is not in engagement, relative rotation can be performed between the clutch housing 257 and the clutch hub 259. In this case, as described above, even when torque transmitted from the engine 19 side to the pinion gear 10 is input to the clutch hub 259 through the output shaft 267, the torque is not transmitted to the clutch housing 257. Consequently, the torque transmission coupling 1E is in the state of non-transmission of the torque, so that the vehicle is enabled to travel in the 2WD state with front wheels 29 and 31 being driven, as described above.

Upon rotational driving of the electric motor 2111, the base-side driving gear 2119 and the movable-side driving gear 2121 integrally rotate through the rotational driving shaft 2113. The rotation causes the rotation of the base gear 289 engaged with the base-side driving gear 2119 and the rotation of the movable gear 291 engaged with the movable-side driving gear 2121.

At this time, according to the difference between the engagement radii of the gear 289 side and the movable gear 291 side, while rotating in the same direction, the gears 289 and 291 perform slow relative rotation little by little. The relative rotation causes the cam surfaces of the base gear 289 and the movable gear 291 to ride over the ball 2103. In this case, since the base gear 289 is supported on the outer surface 285 of the transfer case 5 through the needle bearing 2105, the thrust generated by the cam mechanism 2101 exerts as a reaction force thereof on the movable gear 291 whereby toward move the movable gear 291 to the press member 281.

Upon movement of the movable gear 291, the press member 281 receives the thrust as a compression force through a needle bearing 2107, and the press member 281 causes the frictional multiplate clutch 79 to be engaged in the spacing between the press member 281 and the clutch housing 257. The frictional multiplate clutch 79 exhibits a frictional engagement force corresponding to a compression force of the press member 281 to thereby cause torque transmission from the clutch hub 259 to the clutch housing 257. That is, the torque transmission coupling 1E enters a torque transmission state.

Accordingly, the torque transmitted from the output shaft 267 of the transfer device 3 is transmitted from the clutch hub 259 to the clutch housing 257 through the frictional multiplate clutch 79, and the torque is output from the output shaft 261 to the rear wheels 53 and 55 sides as described above. This enables traveling in the 4WD state with the front wheels 29 and 31 and the rear wheels 53 and 55 being driven.

The torque transmission to the rear wheels 53 and 55 sides can easily be adjusted by rotational driving-force adjustment of the electric motor 2111 described above. Thereby, the torque transmission can be arbitrarily adjusted corresponding to automobile travel conditions such as those of take-off traveling, cornering traveling, on-rough-road traveling, and off-road traveling.

Further, since both the base gear 289 and the movable gear 291 perform slow relative rotation little by little while rotating to the same direction. The thrust generated through the cam mechanism 2101 can also be varied little by little. The engagement force of the frictional multiplate clutch 79 in association with the press member 281 can be easy and accurate to be adjusted.

As described above, the rotational driving shaft 2113 of the electric motor 2111 is disposed with a tilt with respect to the direction along the rotation axis of the compression gear set 283. Thereby, the position and the tilt angle of the electric motor 2111 can be arbitrarily set whereby to enable enhancing the degree of layout freedom.

With the enhanced degree of layout freedom, the portions of the base-side driving gear 2119 and the movable-side driving gear 2121 can be positioned very close to the compression gear set 283. As such, the compression gear set 283 can be miniaturized in terms of the outer circumferential diameter, whereby the overall construction can be formed even more compact, and hence a weight reduction of the torque transmission coupling 1E can be implemented.

Further, the engagement radii are different from each other between the base gear 289 and the base-side driving gear 2119 and between the movable gear 291 and the movable-side driving gear 2121. Accordingly, the rotational driving of the electric motor 2111 can be much decelerated to cause the relative rotation between the pair of base gear 289 and movable gear 291. Thereby, the electric motor 2111 and the compression gear set 283 can be formed compact, and a weight reduction also can be implemented.

The compression gear set 283 has the cam mechanism 2101, thereby enabling thrust causing the engagement of the frictional multiplate clutch 79 to be securely engaged through the relative rotation between the base gear 289 and the movable gear 291.

The thrust of the compression gear set 283 is transmitted from the base gear 289 to the outer surface 285 side of the transfer case 5, and the reaction force thereof is then transmitted to the movable gear 291. Thereby, the frictional multiplate clutch 79 can be securely engaged.

Since the base gear 289 and the movable gear 291 are individually formed of the face gears, the rotational driving shaft 2113 of the electric motor 2111 can easily be tiltedly disposed with respect to the direction along the rotation axis of the compression gear set 283.

In addition, in the present embodiment, since the torque transmission coupling 1E is mounted on the output side of the transfer device 3, the mounting disposition can easily be implemented without unreasonable difficulty.

Figure 8:
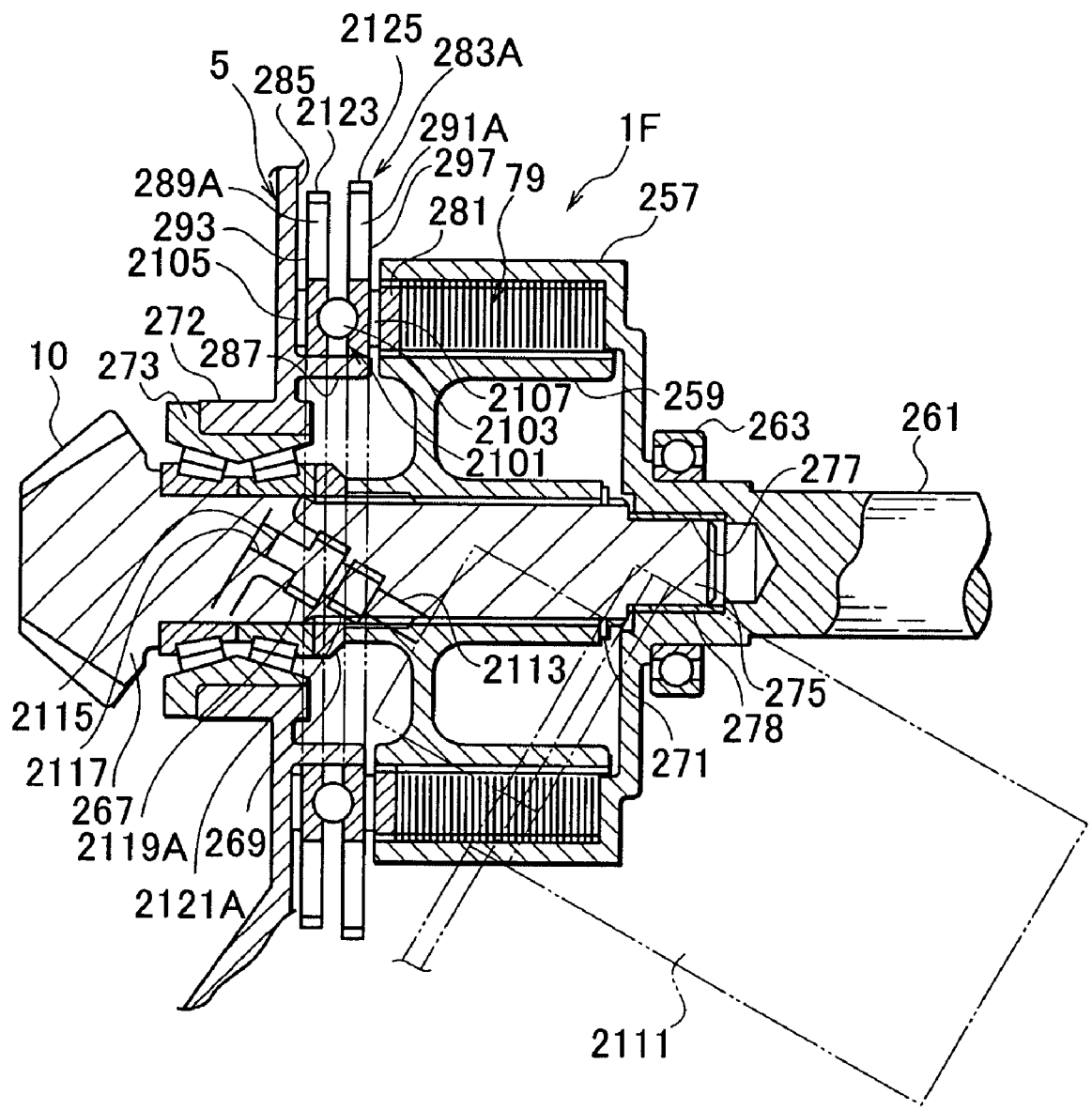
FIG. 8 is a vertical sectional view of a torque transmission coupling and peripheral portions thereof according to a sixth embodiment.

FIG. 8 is a vertical sectional view of a torque transmission coupling 1F and peripheral portions thereof according to a sixth embodiment. The basic construction is the same as that of the fifth embodiment, and description will be made using the like reference numerals for construction portions corresponding to those in the fifth embodiment.

In the torque transmission coupling 1F of the present invention, a base gear 289A and a movable gear 291A and a base-side driving gear 2119A and a movable-side driving gear 2121A are constructed of crossed gears. That is, for example, helical gears 2123 and 2125 are provided on outer circumferences of the base gear plate 293 and the movable gear plate 297, respectively.

The base-side driving gear 2119A and the movable-side driving gear 2121A, which are provided to the rotational driving shaft 2113 of the electric motor 2111 are both formed of helical gears, for example.

Speed reduction ratios between the base gear 289A and the base-side driving gear 2119A and the movable gear 291A and the movable-side driving gear 2121A are set to be slightly different from each other.

Upon rotational driving of the electric motor 2111, when the base-side driving gear 2119A and the movable-side driving gear 2121A rotate through the rotational driving shaft 2113, the base gear 289A and the movable gear 291A co-rotate. With the co-rotation, slow relative rotation occurs between the base gear 289A and the movable gear 291A, and the cam mechanism 2101 generates thrust, whereby the frictional multiplate clutch 79 can be engaged, as in the case described above.

Consequently, also in the present embodiment, substantially the same operational effects as those in the fifth embodiment can be exhibited. In addition, in the present embodiment, since the crossed gears are used, the rotation of the electric motor 2111 can be securely transmitted through the base gear 289A and the movable gear 291A, and even more secure accurately adjustment can be implemented.

Figure 9:
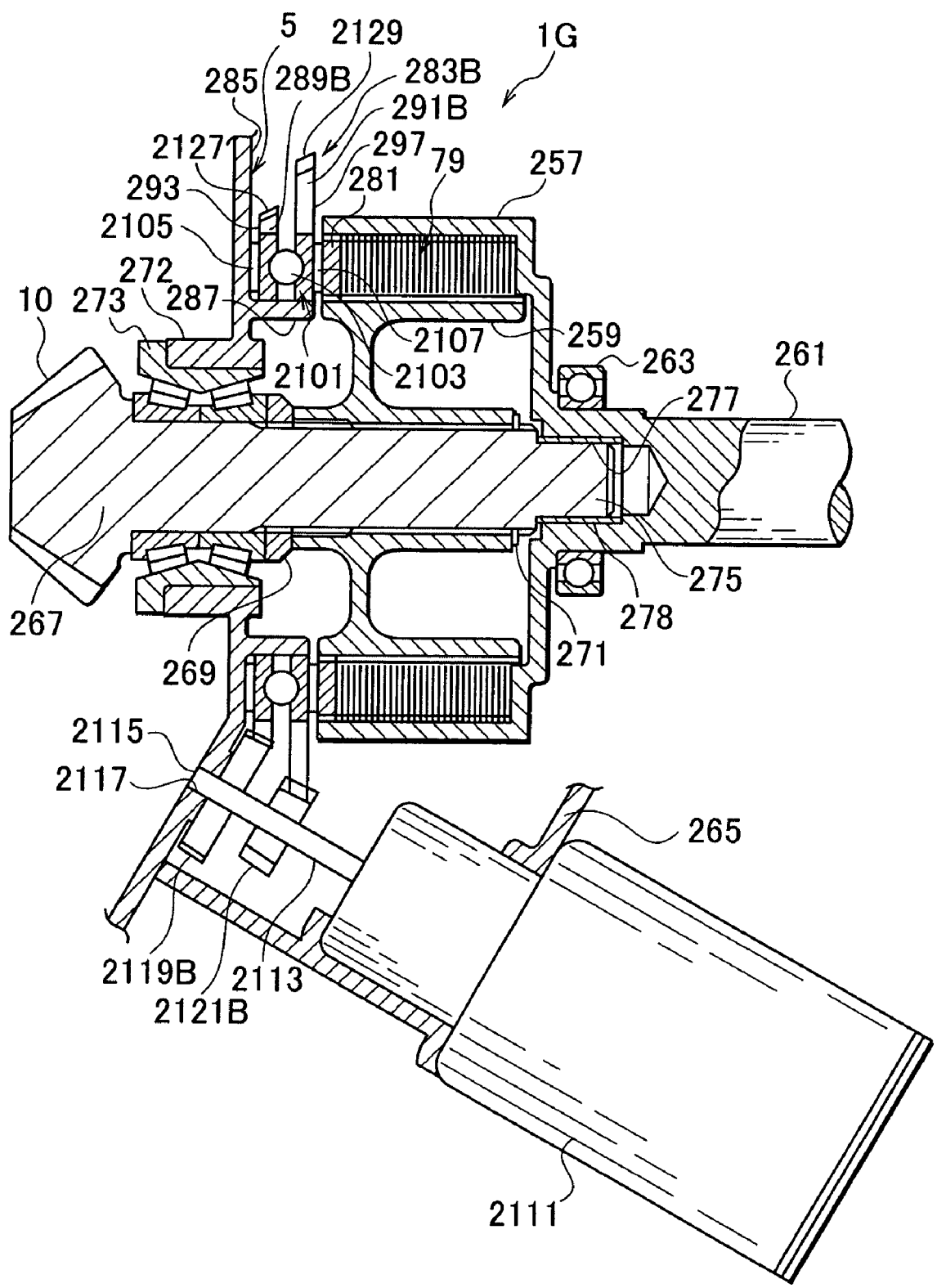
FIG. 9 is a vertical sectional view of a torque transmission coupling and peripheral portions thereof according to a seventh embodiment.

FIG. 9 is a vertical sectional view of a torque transmission coupling 1G and peripheral portions thereof according to a seventh embodiment. The basic construction is the same as that of the fifth embodiment, and description will be made using the like reference numerals for construction portions corresponding to those in the fifth embodiment.

In the torque transmission coupling 1G, a base gear 289B and a movable gear 291B, and a base-side driving gear 2119B and a movable-side driving gear 2121B are formed of bevel gears. That is, bevel gears 2127 and 2129 are provided with outer circumferences of the base gear plate 293 and the movable gear plate 297 of a compression gear set 283B, respectively.

The base-side driving gear 2119B and the movable-side driving gear 2121B, which are individually formed of the bevel gears, are fixed to the rotational driving shaft 2113.

Speed reduction ratios between the base gear 289B and the base-side driving gear 2119B and the movable gear 291B and the movable-side driving gear 2121B are set to be slightly different from each other.

Upon rotational driving of the electric motor 2111, when the base-side driving gear 2119B and the movable-side driving gear 2121B rotate through the rotational driving shaft 2113, the base gear 289B and the movable gear 291B co-rotate. With the co-rotation, the base gear 289B and the movable gear 291B rotate and concurrently perform slow relative rotation. The cam mechanism 2101 generates thrust, whereby the frictional multiplate clutch 79 can be engaged, as in the case described above.

Consequently, also in the present embodiment, substantially the same operational effects as those in the fifth embodiment can be exhibited. In addition, in the present embodiment, since the base gear 289B and the movable gear 291B and the base-side driving gear 2119B and the movable-side driving gear 2121B are formed of the bevel gears, the rotational driving force of the electric motor 2111 can be securely transmitted to the base gear 289B and the movable gear 291B.

In the fifth to seventh embodiments, the outer circumferential diameters of the base gear 289, 289A, 289B and the movable gear 291, 291A, 291B are set to be different from each other. However, the construction may be such that the base gear 289, 289A, 289B and the movable gear 291, 291A, 291B are formed of spur gears having the same diameter, the base-side driving gear 2119, 2119A, 2119B is formed of a face gear having a relatively small diameter, and the movable-side driving gear 2121, 2121A, 2121B is formed of a face gear having a relatively large diameter. Alternatively, the construction may be such that both the base gear 289, 289A, 289B and movable gear 291, 291A, 291B and the base-side driving gear 2119, 2119A, 2119B and electric motor 121 are formed of face gears so that the engagement radii are different from each other.

By way of the disposition, each of the above-described torque transmission couplings 1, 1A, 1B, 1C, 1D, 1E, 1F, and 1G is not limited to that to be mounted on the output side of the transfer device 3. The disposition of each of the torque transmission couplings may be appropriately selected as in the case of each of torque transmission couplings 1H, 1I, 1J, 1K, 1L, 1M, 1X, and 1Y shown in FIG. 1.

The torque transmission coupling 1H is interposed in the propeller shaft 35, and is capable of performing torque transmission to the rear wheels 53 and 55 sides, similarly to the case described above. When the torque transmission coupling 1H is brought into a torque non-transmission state, the rotation is not transmitted from the rear wheels 53 and 55 to, for example, the constant-velocity universal joint 33 or the output shaft 61 or 267 located on the upstream side of the torque transmission coupling 1H, whereby energy loss can be prevented.

The torque transmission couplings 1I and 1J are interposed in acceleration shafts 49 and 51, respectively. The torque transmission coupling 1I or 1J may be provided only in one of the acceleration shafts. In the case where the torque transmission coupling 1I or 1J is thus interposed in the acceleration shaft 49 and 51, when the torque transmission coupling 1I or 1J is brought into the torque non-transmission state, the rotation is not transmitted from the rear wheel 53 or 55 to the rear differential 43 side, whereby energy loss can be even more restrained in the 2WD state.

The torque transmission couplings 1K and 1L are interposed in the acceleration shafts 25 and 27 on the front wheels 29 and 31, respectively. The functions of the torque transmission couplings 1K and 1L are substantially the same as those of the respective torque transmission couplings 1I and 1J.

The torque transmission coupling 1M is provided to the drive pinion shaft 39, and is disposed in the differential carrier 47 of the rear differential 43.

The torque transmission coupling 1X is provided in a take-off clutch between the output of the engine 19 working as a prime mover and the transmission 21.

The torque transmission coupling 1Y is provided as a limited slip differential of the rear differential 43.

Figure 10:
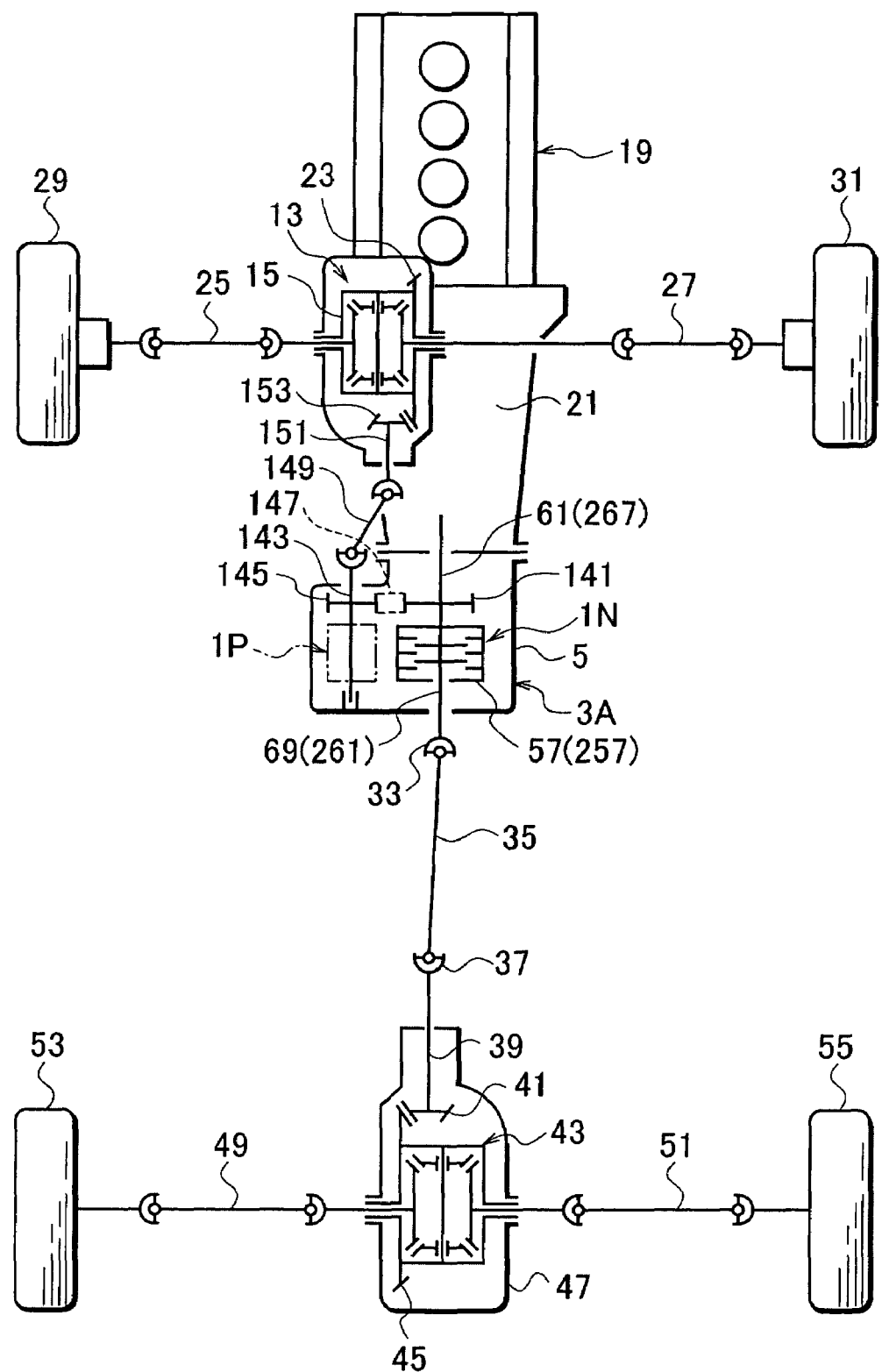
FIG. 10 is a skeleton plan view of a 4WD vehicle, showing a disposition of a torque transmission coupling according to an eighth embodiment of the present invention.

FIG. 10 is a skeleton plan view of a 4WD vehicle, showing a disposition of a torque transmission coupling according to an eighth embodiment. Description will be made using the like reference numerals for construction portions corresponding to those shown in FIG. 1.

In the present embodiment, a torque transmission coupling 1N is provided in a transfer device 3A. In the torque transmission coupling 1N, the output shaft 61 or the output shaft 267, which is shown in FIGS. 2 to 9, is coupled to output the torque transmitted from a transmission 21 in FIG. 10. The shaft 61 or 267 is coupled to the propeller shaft 35 through the constant-velocity universal joint 33.

A gear 141 is integrally provided in the output shaft 61 or 267. A chain 147 is wound between the gear 141 and a gear 145 provided on a transmission shaft 143. The transmission shaft 143 is connected to a transmission shaft 151 through a propeller shaft 149. A pinion gear 153 of the transmission shaft 151 engages a ring gear 23 of a front differential 13.

Under engagement control of the frictional multiplate clutch 79, on one hand, torque transmission is performed to the propeller shaft 35 side through the frictional multiplate clutch 79. On the other hand, torque input can be performed in an online state from the transmission 21 to the front differential 13 through the gear 141, the chain 147, the gear 145, the rear transmission shaft 143, the propeller shaft 149, the transmission shaft 151, the pinion gear 153, and the ring gear 23.

By performing the engagement control of the frictional multiplate clutch 79 of the torque transmission coupling 1N in correspondence to the travel state, torque distribution to the rear wheels 53 and 55 sides can be controlled corresponding to the travel state of a vehicle, and the torque transmission can be performed in the online state to the front wheels 29 and 31. Consequently, a 2WD operation and an accurate 4WD operation can be implemented.

A torque transmission coupling may be provided by way of a torque transmission coupling 1P with the transmission shaft 143. In this case, the gear 145 is provided in a clutch housing 57 or 257 shown in FIGS. 2 to 9, and the output shaft 61 or 267 is used for the transmission shaft 143. The output shaft 69 or 261 is just supported to the transfer case 5 to be rotatable.

As such, by performing the engagement control of the frictional multiplate clutch 79 of the torque transmission coupling 1P in correspondence to the travel state of a vehicle, torque distribution to the front wheels 29 and 31 sides can be controlled corresponding to the travel state, and the torque transmission can be performed in the online state to the rear wheels 53 and 55. Consequently, a 2WD operation and an accurate 4WD operation can be implemented.

Figure 11:
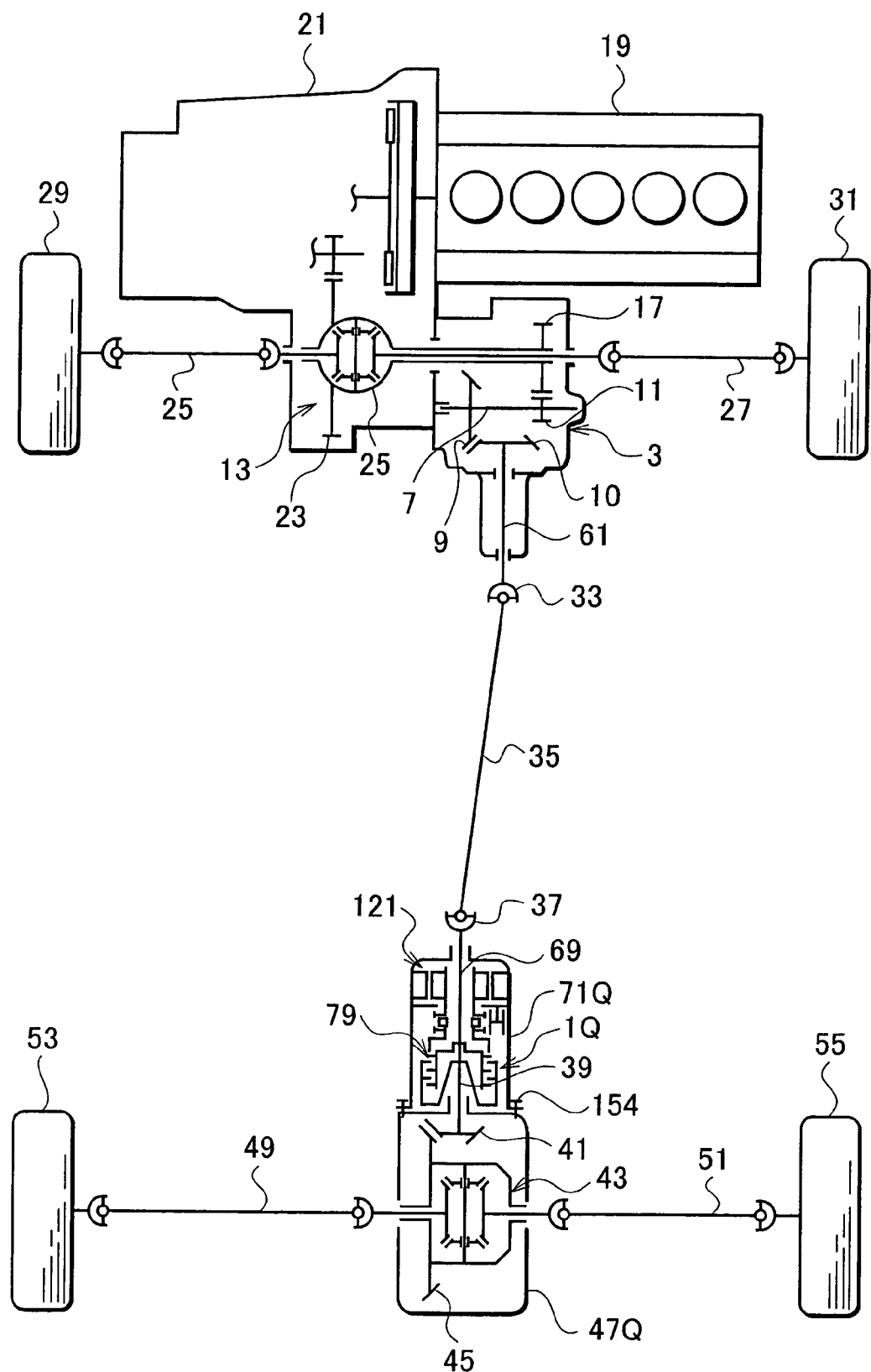
FIG. 11 is a skeleton plan view of a 4WD vehicle, showing a disposition of a torque transmission coupling according to a ninth embodiment.
Figure 12:
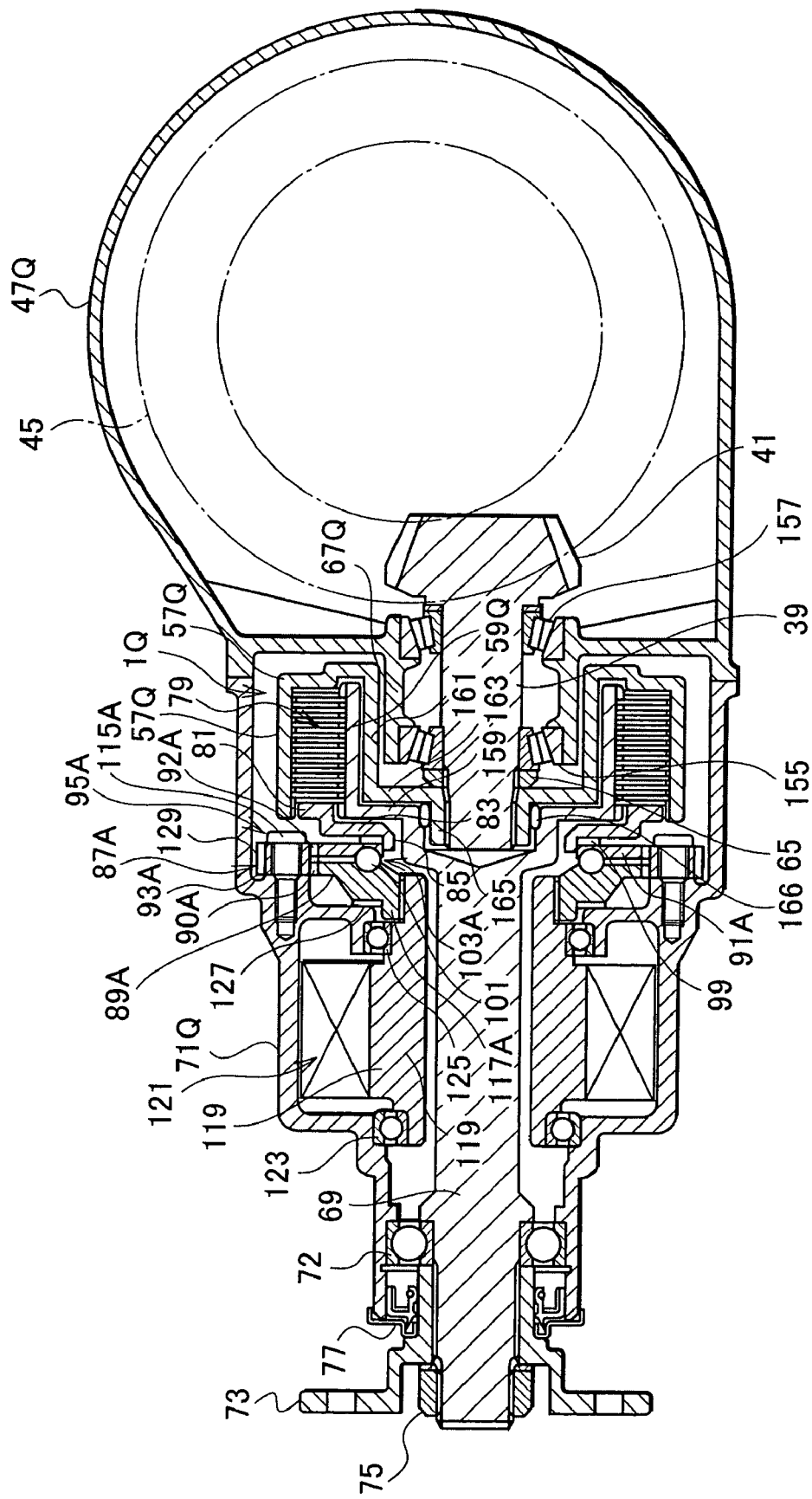
FIG. 12 is a vertical sectional view of the torque transmission coupling and peripheral portions thereof according to the ninth embodiment.

FIG. 11 is a skeleton plan view of a 4WD vehicle, showing a disposition of a torque transmission coupling according to a ninth embodiment. FIG. 12 is a vertical sectional view of a torque transmission coupling 1Q and peripheral portions thereof according to the ninth embodiment. The basic construction of the present embodiment is similar to that of the second embodiment, and description will be made using the like reference numerals for construction portions corresponding to those shown in FIG. 3.

The torque transmission coupling 1Q of the present embodiment is mounted a rear differential 43Q. The torque transmission coupling 1Q is stored in a housing 71Q serving as the support body side. The housing 71Q is fastening-coupled with bolts 154 to a differential carrier 47Q provided in the support body side together with the housing 71Q. A drive pinion gear 41 of a drive pinion shaft 39 serving as a rotation shaft of the torque transmission coupling 1Q is engaged with a ring gear 45 of the rear differential 43Q. An output shaft 69 of the torque transmission coupling 1Q has a coupling flange 73 coupled to a constant-velocity universal joint 37. An electric motor 121 is supported by being stored in the housing 71Q, and is disposed in a vehicle-traveling direction foremost side of the torque transmission coupling 1Q, so that improvement of cooling efficiency is implemented.

The frictional multiplate clutch 79 according to the present embodiment is disposed on outer circumferential of bearing 155 and 157 that rotatably support the drive pinion shaft 39.

In more detail, a vertical wall 159 of a clutch hub 59Q serving as an input rotary member is closed toward the output shaft 69 and thereby disposed to an end portion of the clutch hub 59Q. An inner cylinder portion 161 is integrally provided on an inner circumference side of a clutch housing 57Q serving as an output rotary member. A vertical wall 163 is provided in an end portion of the inner cylinder portion 161. An inner circumference portion 165 of the vertical wall 163 is spline-engaged with an end portion of the drive pinion shaft 39. A support portion 67Q is provided with the differential carrier 47Q. The support portion 67Q extended from the differential carrier 47 to an inner circumference side of the inner cylinder portion 161 supports the bearings 155 and 157. The bearings 155 and 157 support the drive pinion shaft 39 to be rotatable with respect to the support portion 67Q. In addition, a bearing 166 is provided between the output shaft 69 and the inner circumference portion 165 of the clutch housing 57Q whereby to have the supporting relationship with one another.

Accordingly, in the present embodiment, in addition to the operational effects of the second embodiment, the bearing span supporting the drive pinion shaft 39 can be increased to securely support the drive pinion shaft 39 in the support portion 67Q. In addition, since the support portion 67Q is stored in the inner circumference side of the inner cylinder portion 161, the interior spacing can be effectively used, consequently enabling the overall construction to be formed compact.

Figure 13:
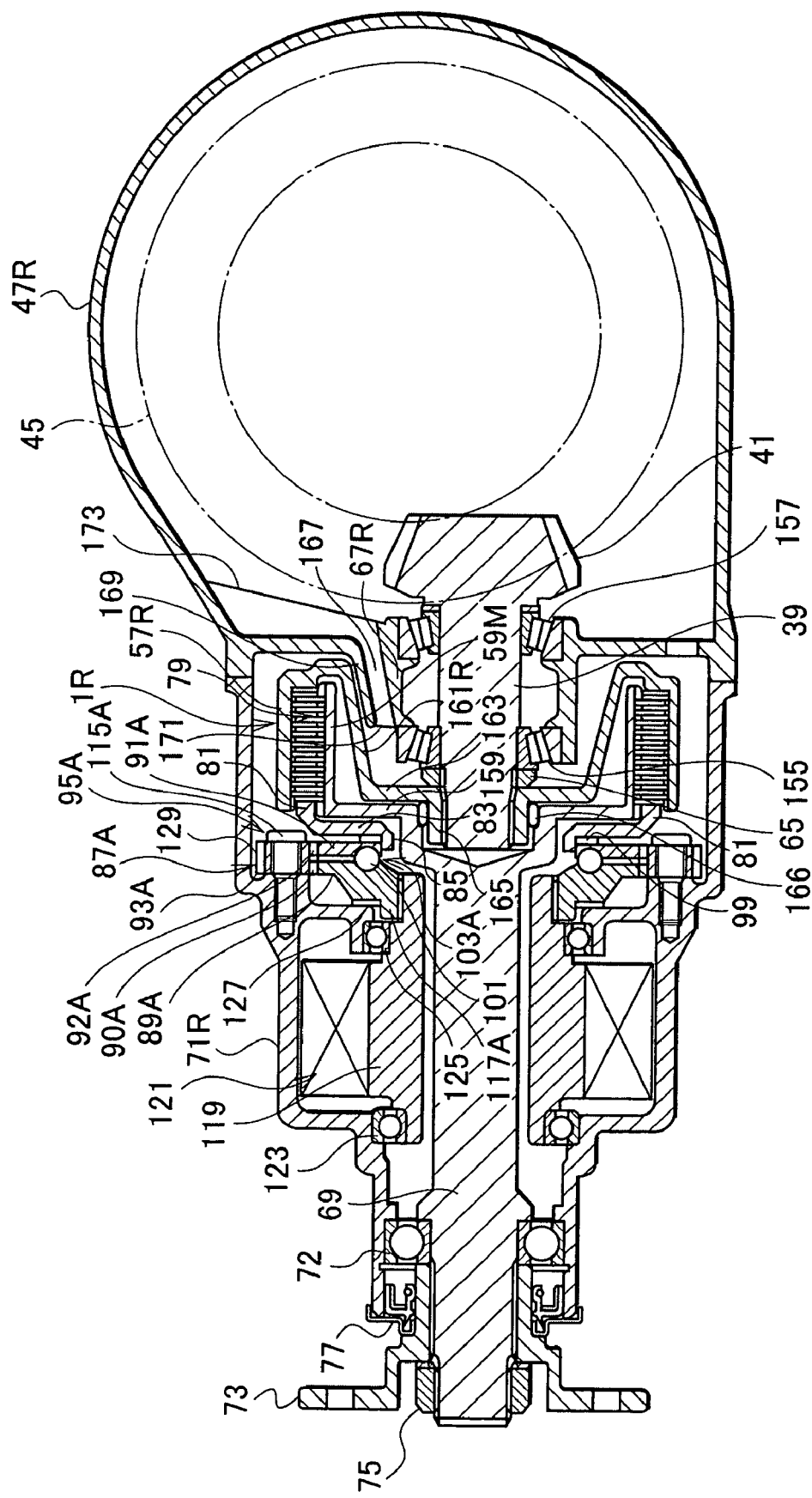
FIG. 13 is a vertical sectional view of a torque transmission coupling and peripheral portions thereof according to a tenth embodiment.

FIG. 13 is a vertical sectional view of a torque transmission coupling 1R and peripheral portions thereof according to a tenth embodiment. The basic construction of the present embodiment is similar to that of the ninth embodiment shown in FIG. 12, and description will be made using the like reference numerals for construction portions corresponding to those shown in FIG. 12.

In the present embodiment, an oil path 167 is provided with a support portion 67R a differential carrier 47R that supports bearings 155 and 157. The oil path 167 extends from one side to the other side of the support portion 67R to guide lubricating oil to the bearing 155. A built-up portion 169 is provided over an outer circumference of the support portion 67R. The oil path 167 is provided in the built-up portion 169 to form a through-hole with a tilt declining toward an end face 171 of the built-up portion 169 from the inside differential carrier 47R. The end face 171 is positioned at one side end of an outer circumference of the bearing 155. The outer circumference of the bearing 155 is open in that portion. An outer surface of the built-up portion 169 is formed with a tilt corresponding to the tilt of the oil path 167. Corresponding to this tilt, also an inner cylinder portion 161R of a clutch housing 57R is formed in a tapered shape. In the differential carrier 47R, a guide wall 173 is provided with an end portion of the oil path 167. The guide wall 173 continues to one sidewall of the oil path 167.

At the time of engagement rotation of the pinion gear 41 and the ring gear 45, splashing gear oil in the differential carrier 47R is guided by the guide wall 173 and reaches the oil path 167 or the splashing gear oil directly reaches the oil path 167. Gear oil in the oil path 167 flows along the tilt of the oil path 167 to the outer circumferential surface of the bearing 155 and the bearing 155 is sufficiently lubricated by the gear oil.

Accordingly, in addition to the operational effects of the ninth embodiment, even when the support portion 67R is formed to be long to increase the bearing span, the bearing 155 can be sufficiently lubricated by the gear oil.

Figure 14:
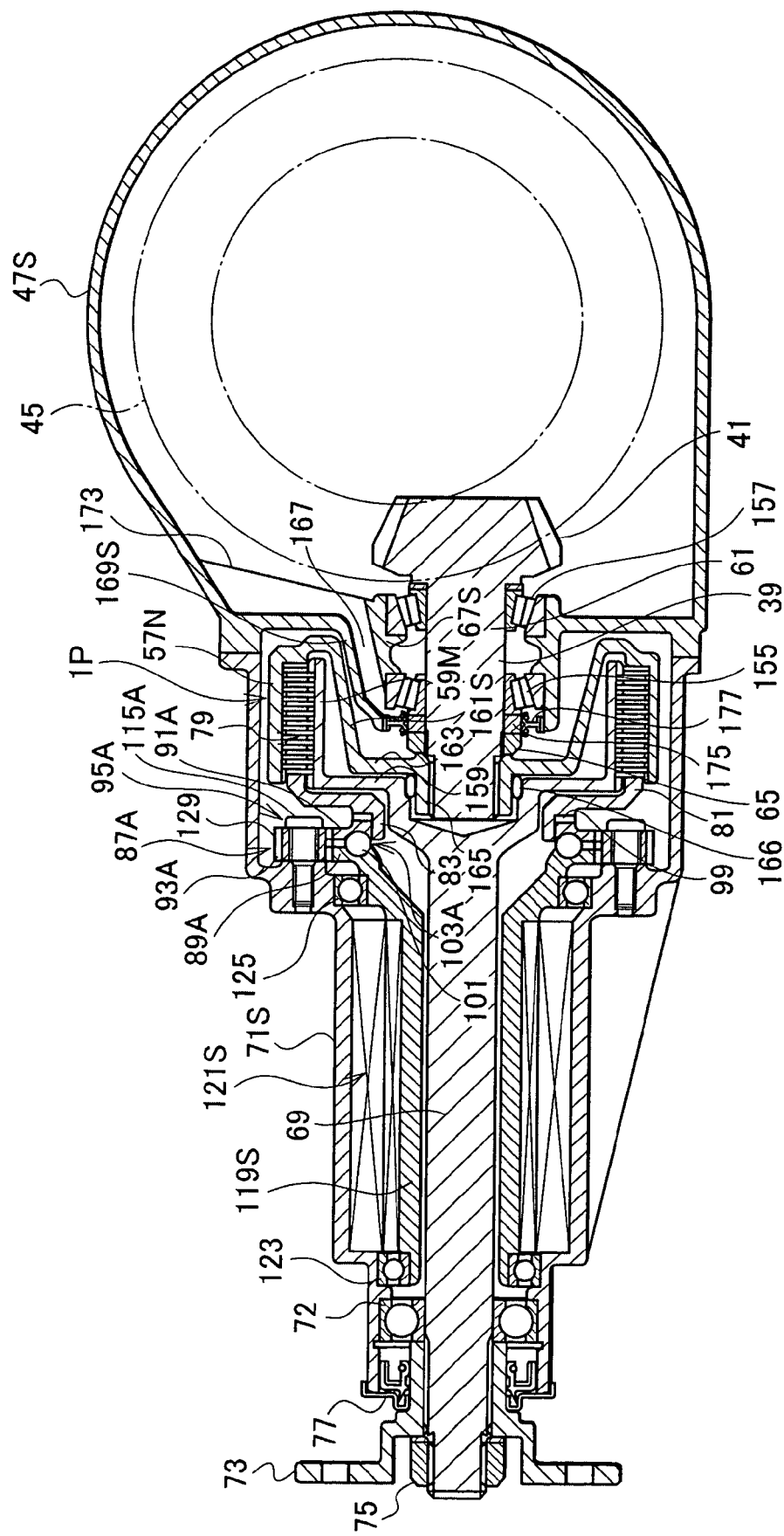
FIG. 14 is a vertical sectional view of a torque transmission coupling and peripheral portions thereof according to an eleventh embodiment.

FIG. 14 is a vertical sectional view of a torque transmission coupling 1S and peripheral portions thereof according to an eleventh embodiment. The basic construction of the present embodiment is similar to that of the tenth embodiment shown in FIG. 13, and description will be made using the like reference numerals for construction portions corresponding to those shown in FIG. 13.

In the present embodiment, a support portion 67S and a built-up portion 169S are formed somewhat longer than a bearing 155 to extend in the direction along the rotation axis. A sealed slidable ring 175 is disposed in opposition to an end inner circumference of a support portion 67S. A seal 177 is provided between the support portion 67S and the sealed slidable ring 175. The sealed slidable ring 175 is tightening-positioned between a nut 65 and an inner race of the bearing 155. In the construction thus formed, an oil path 167S is extended to reach an outer circumferential surface of the bearing 155 or a portion between the inner race and an outer race of the bearing 155.

An electric motor 121S in the present embodiment is formed to be long, and a gear 89A of a compression gear set 87A is integrally provided in an end portion of a rotary driving shaft 119S.

In the present embodiment, splashing gear oil reached an oil path 167S flows along a tilt of the oil path 167S to an outer circumference of the bearing 155. Gear oil flows from the outer circumference of the bearing 155 to the portion between the inner race and the outer race, and the bearing 155 is securely lubricated. Overflow oil occurring during lubrication of the bearing 155 flows to an inner circumference side of the support portion 67S and can return into a differential carrier 47S while lubricating a bearing 157 on the other side. The frictional multiplate clutch 79 side is partitioned by the seal 177 from the bearing 155 side, so that oil such as automatic transmission oil different from the gear oil can be used therein. Using the automatic transmission oil enables components such as the frictional multiplate clutch 79 to be accurately lubricated independently of components such as the bearing 155.

Accordingly, in addition to the operational effects of the tenth embodiment, the bearing 155 can be lubricated more securely, and the bearing 155 side and the frictional multiplate clutch 79 side can be individually lubricated with appropriate oils more securely and accurately.

Since an electric motor 121S is formed to be long, the outer circumferential diameter can be reduced.

Figure 15:
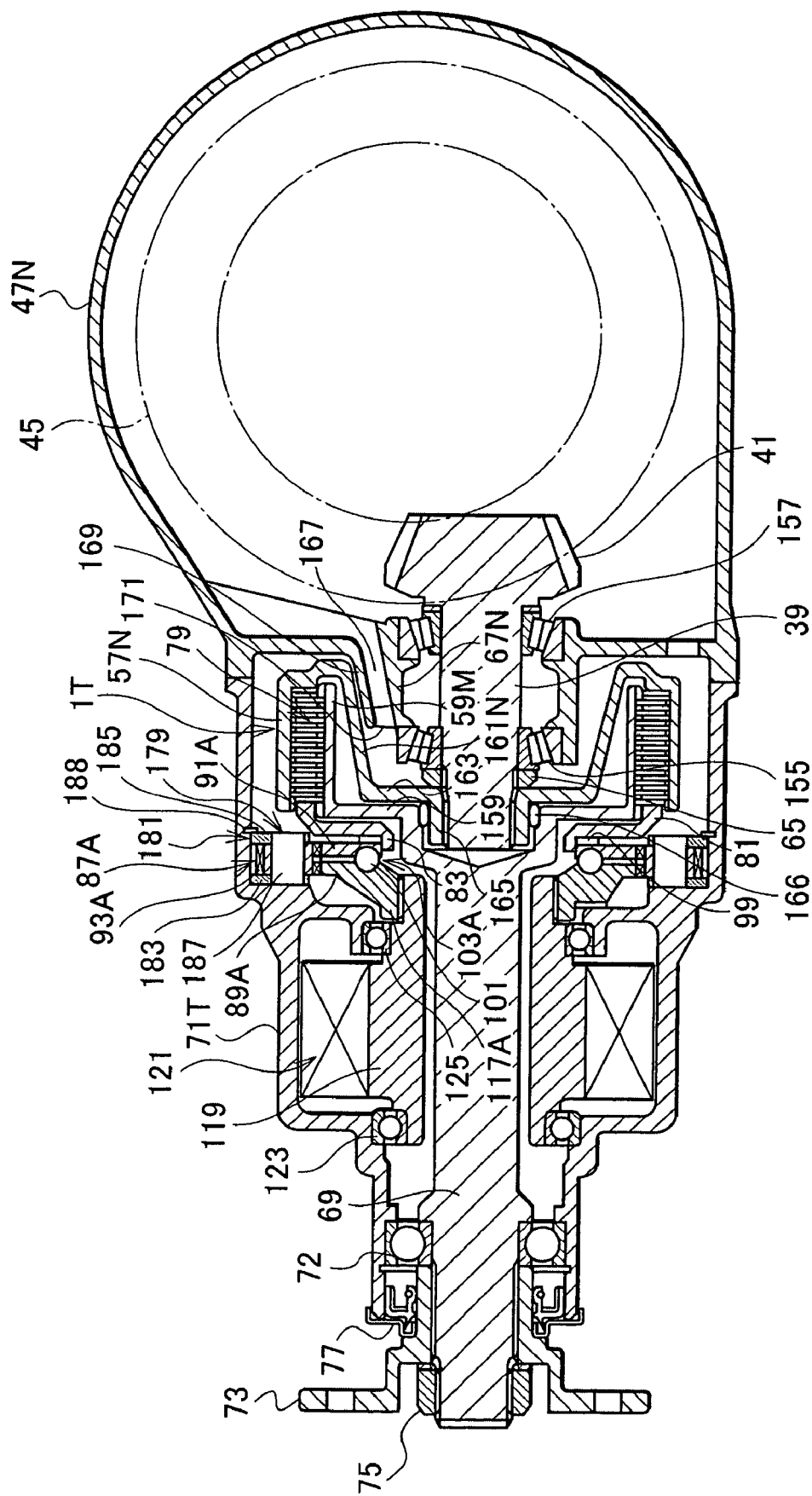
FIG. 15 is a vertical sectional view of a torque transmission coupling and peripheral portions thereof according to a twelfth embodiment.
Figure 16:
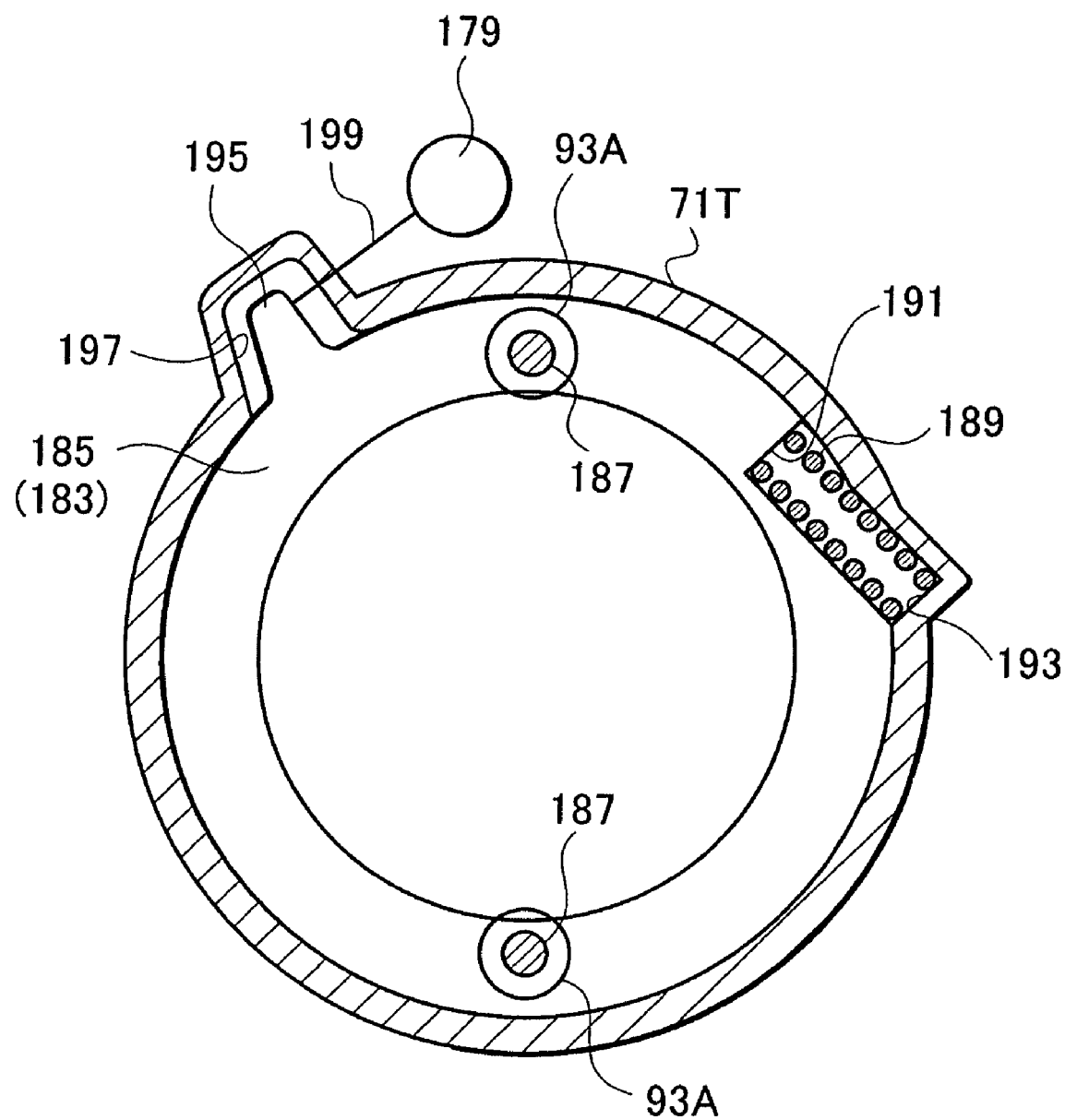
FIG. 16 is a sectional view of displacement detection means and peripheral portions thereof according to a thirteenth embodiment.

FIGS. 15 and 16 show a twelfth embodiment of the present invention. Specifically, FIG. 15 is a vertical sectional view of a torque transmission coupling 1T and peripheral portions thereof; and FIG. 16 is a sectional view of displacement detection means and peripheral portions thereof. The basic construction of the present embodiment is similar to that of the tenth embodiment shown in FIG. 13, and description will be made using the like reference numerals for construction portions corresponding to those shown in FIG. 13.

In the present embodiment, there is provided a displacement sensor 179 serving as the displacement detection means that obtains the engagement force of the frictional multiplate clutch 79.

In more detail, a planetary carrier 181 for supporting a planetary gear 93A is supported in housing 71T to be capable of performing constant-angle relative rotation. The planetary carrier 181 is constructed of a pair of carrier plates 183 and 185 and a carrier pin 187. The carrier plate 185 is positioned in the direction along the rotation axis according to a stopper 188 provided in an inner surface of the housing 71T.

Referring to FIG. 16, a coil spring 189 serving as urging means is interposed between the planetary carrier 181 and the housing 71T. More specifically, a cutout portion 191 is provided in the carrier plates 183, 185 of the planetary carrier 181. A spring storage portion 193 opposing the cutout portion 191 is provided in the housing 71T. The coil spring 189 is interposed between the cutout portion 191 and the spring storage portion 193. Consequently, the coil spring 189 generates an urging force to thereby interfere to rotation of the planetary carrier 181 that rotates in the same direction at the time of rotational driving by the electric motor 121.

A convex portion 195 is provided with an outer circumference of at least one of the carrier plates 183 and 185. The convex portion 195 is inserted into a concave portion 197 formed in the housing 71T. The convex portion 195 is relatively movable in the rotational direction of the carrier plates 183 and 185 in the concave portion 197, and the planetary carrier 181 is supported in the housing 71T to be capable of performing constant-angle relative rotation.

The displacement sensor 179 is disposed in a predetermined portion in the outside of the housing 71T. The displacement sensor 179 is linked with the convex portion 195 through a link 199. Accordingly, upon movement of the convex portion 195, the displacement amount of the movement is input to the displacement sensor 179 through the link 199, and the displacement amount of rotation of the carrier plate 183, 185 can be detected.

Upon rotational driving of the electric motor 121, the gear 89A on the one side is integrally rotationally driven over the rotary driving shaft 119. With the gear 89A being rotationally driven, the planetary gear 93A engaged therewith starts rotation, and the gear 91A engaged with the planetary gear 93A co-rotates therewith. That is, the gear 89A and the gear 91A rotate together.

The gear ratio between the planetary gear 93A and the gear 89A is set to slightly be different from the gear ratio between the planetary gear 93A and the gear 91A. Accordingly, while rotating with the gear 89A, the gear 91A performs relative rotation at a low velocity with respect to the gear 89A. This relative rotation causes the cam mechanism 103A to serve similar to the above and then generates thrust, whereby the frictional multiplate clutch 79 is engaged.

With the engagement of the frictional multiplate clutch 79, the gear 91A receives a rotation interfering force that is proportional to the engagement force. This rotation interfering force causes a rotational force proportional to the engagement force to be transmitted to the carrier plates 183 and 185 through the carrier pin 187 by revolution due to rotation of the planetary gear 93A. The rotational force then causes the carrier plates 183 and 185 to perform relative rotation with respect to the housing 71T in resistance with the urging force of the coil spring 189. This causes relative movement of the convex portion 195 in the concave portion 197. The relative movement is then input to the displacement sensor 179 through the link 199, thereby enabling the displacement proportional to the engagement force to be detected.

Accordingly, the detected displacement is input to a controller, and an engagement force of the frictional multiplate clutch 79 is obtained through predetermined operations. This enables a process such as fine engagement adjustment of the frictional multiplate clutch 79 to be accurately performed.

Consequently, also in the present invention, operational effects substantially the same as those of the tenth embodiment can be exhibited, and the fine engagement adjustment of the frictional multiplate clutch 79 can be accurately performed.

Figure 17:
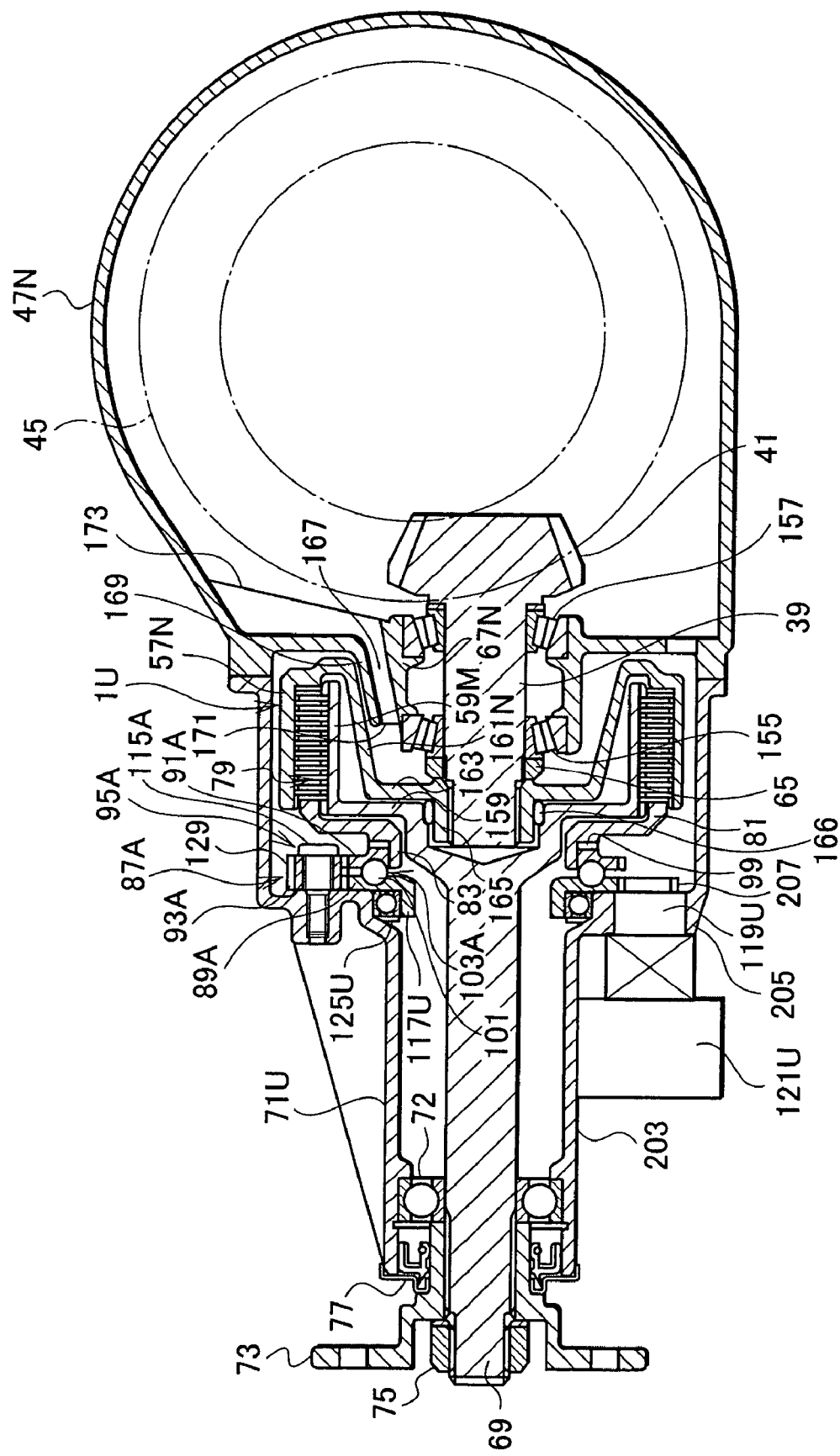
FIG. 17 is a vertical sectional view of a torque transmission coupling and peripheral portions thereof according to a fourteenth embodiment.

FIG. 17 shows a fourteenth embodiment of the present invention; more specifically, the Figure is a vertical sectional view of a torque transmission coupling 1U and peripheral portions thereof. The basic construction of the present embodiment is similar to that of the tenth embodiment shown in FIG. 13, and description will be made using the like reference numerals for construction portions corresponding to those shown in FIG. 13.

In the present embodiment, an electric motor 121U is disposed outside of a coupling housing 71U.

A stepped portion 203 is provided in the housing 71U. The electric motor 121U is disposed by being stored in an outer-circumferential spacing formed with the stepped portion 203. A rotary driving shaft 119U is rotatably supported by a vertical wall portion 205 of the housing 71U. A driving gear 207 in the housing 71U is mounted on a rotary driving shaft 119U. The driving gear 207 engages a gear 89A of a compression gear set 87A.

A ring 117U is integrally provided to the gear 89A, in which the ring 117U is rotatably supported by a bearing 125U.

With the electric motor 121U being driven, the gear 89A of the compression gear set 87A can be rotated through the rotary driving shaft 119U and the driving gear 207. This enables engagement adjustment of the frictional multiplate clutch 79 in a manner similar to that in the tenth embodiment.

Consequently, also in the present embodiment, operational effects substantially the same as those of the seventh embodiment can be exhibited, and the housing 71U is enabled to be formed even more compact.

Figure 18:
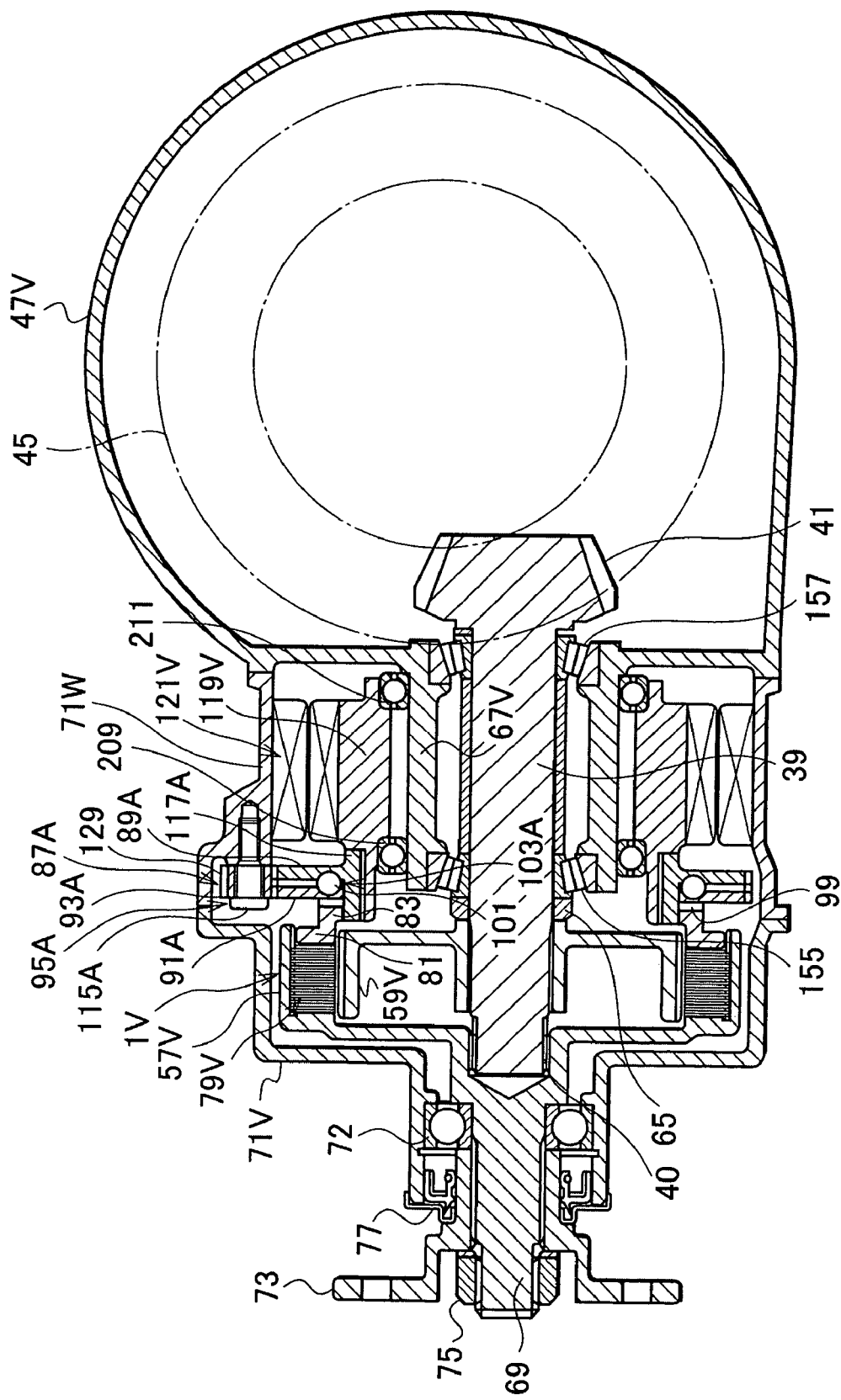
FIG. 18 is a vertical sectional view of a torque transmission coupling and peripheral portions thereof according to a fifteenth embodiment.

FIG. 18 shows a fifteenth embodiment of the present invention; the Figure is a vertical sectional view of a torque transmission coupling 1V and peripheral portions thereof. The basic construction of the present embodiment is similar to that of the ninth embodiment shown in FIG. 12, and description will be made using the like reference numerals for construction portions corresponding to those shown in FIG. 12.

The present embodiment is constructed such that a frictional multiplate clutch 79V and an electric motor 121V are disposed by exchanging the positions of the corresponding frictional multiplate clutch and the electric motor in the sixth embodiment. The electric motor 121V is stored in a housing 71W coupled to a differential carrier 47V, and is disposed on the outer circumferential sides of bearings 155 and 157.

A support portion 67V is provided to the differential carrier 47V. The support portion 67V extends to an inner circumference side of the housing 71W toward the side of housing 71V. The bearings 155 and 157 are supported by the support portion 67V. A drive pinion shaft 39 is supported by the bearings 155 and 157 to be rotatable with respect to the support portion 67V.

A rotary driving shaft 119V is rotatably supported on an outer circumference of the support portion 67V through bearings 209 and 211. An inner race of the bearing 211 is supported in abutment on the differential carrier 47V in the direction along the rotation axis.

A gear 89A of a compression gear set 87A is spline-engaged with the rotary driving shaft 119V. The differential carrier 47V, the housing 71W, and the housing 71V are integrally coupled using tightening bolts (not shown).

A clutch housing 57V of the torque transmission coupling 1V is integrally provided as an input rotary member to a rotary shaft 69, and a clutch hub 59V is spline-engaged as an output rotary member to a drive pinion shaft 39.

Upon rotational driving of the electric motor 121V, the gear 89A on the one side is integrally rotationally driven over the rotary driving shaft 119V. With the gear 89A being rotationally driven, the planetary gear 93A engaged therewith starts rotation, and the gear 91A engaged with the planetary gear 93A co-rotates therewith. That is, the gear 89A and the gear 91A rotate together.

The gear ratio between the planetary gear 93A and the gear 89A is set to slightly be different from the gear ratio between the planetary gear 93A and the gear 91A. Accordingly, while rotating with the gear 89A, the gear 91A performs relative rotation at a low velocity with respect to the gear 89A. This relative rotation causes the cam mechanism 103A to serve similar to the above and then generates thrust.

The gear 89A is supported to the differential carrier 47V side in the direction along the rotation axis through the rotary driving shaft 119V and the bearing 211. As such, the thrust is received on the differential carrier 47V, and the gear 91A is moved toward a pressure reception section 83 by a reaction force of the thrust. This movement enables the frictional engagement of the frictional multiplate clutch 79 with the press member 81, as in the case described above. A needle bearing 40 is disposed between the output shaft 69 and the drive pinion shaft 39, in which mutual supporting relationship therebetween is directly established.

Accordingly, also the present embodiment is capable of exhibiting substantially the same operational effects as those of the ninth embodiment. In addition, in the present embodiment, the bearing span of the drive pinion shaft 39 can be increased to securely support the drive pinion shaft 39 to a support portion 67V. In addition, since the support portion 67V is stored in the inner circumference side of the electric motor 121V, the interior spacing can be effectively used, consequently enabling the overall construction to be formed compact.

The frictional engagement section may be of the type that just generates a frictional engagement force through engagement, so that it is not limited to the frictional multiplate clutch 79, but a cone clutch, for example, may be arbitrarily selected therefor.

In terms of the disposition, each of the torque transmission couplings 1Q, 1R, 1S, 1T, 1U, and 1V is not limited to that to be mounted on the rear differential 43 side, and the disposition may be appropriately selected as in each of the torque transmission couplings 1, 1A, 1B, 1C, 1D, 1E, 1F, 1G, 1H, 1I, 1K, 1L, 1M, 1X, and 1Y. In this case, coupling of individual axes is carried out with appropriate modifications as in each of the torque transmission couplings 1, 1A, 1B, 1C, and 1D.

What is claimed is:

1. A torque transmission coupling comprising:
input-output rotary members rotatably supported to perform input-output transmission of torque;
a frictional engagement section provided between the input-output rotary members to perform torque transmission between the input-output rotary members by enforcing frictional engagement;
a compression member set that comprises a pair of members capable of performing relative rotation and that generates thrust through the relative rotation between the members to thereby cause the frictional engagement section to perform the frictional engagement; and
a rotary actuator that causes both of the members of the compression member set to perform engagement-rotational driving whereby to cause the relative rotation;
the compression member set is a compression gear set that comprises a pair of gears provided as the pair of members, an outer gear engaged with the gears and an outer gear support for supporting the outer gear, and that converts an input generated by rotational driving into a compression force in the direction along a rotation axis to thereby cause the frictional engagement section to enforce the frictional engagement, wherein gear ratios or engagement radii between the pair of individual gears and the outer gear are different from each other; any one of the pair of gears, the outer gear, and the outer gear support is non-rotatably supported; any other one thereof is rotationally driven; and the other thereof performs the relative rotation;
the rotary actuator performs the rotational driving; and
the pair of gears comprise a proximal gear and a distal gear;
the distal gear being disposed further from the rotary actuator than the proximal gear; and
the proximal gear being disposed radially inward of said outer gear;
wherein the coupling further comprises:
an exterior housing;
a pinion shaft rotatably connected with the input rotary member;
the pinion shaft being rotatably supported within the housing by a pair of axially spaced bearings; and
center axis of each bearing and said pinion shaft being mutually angularly offset;
wherein:
the outer gear support is supported to be capable of performing constant-angle relative rotation;
an urging member to be interposed between the outer gear support and a support body side is provided for biasing against rotation of the outer gear support;
the torque transmission coupling further comprises displacement detection means that detects a displacement amount when the outer gear support performs rotational displacement in resistance with the urging member; and
an engagement force of the frictional engagement section is obtained in accordance with the displacement amount detected
the outer gear support comprises:
first and second radially extending plates disposed on axially opposing ends of the outer gear;
a pin connecting the plates and supporting the outer gear;
one of the plates including a cutout, the cutout having a first end disposed between an inner and outer radius of the plate and the cutout extending tangentially from the first end; and
the urging member being a biasing member that engages the plate cutout.

2. A torque transmission coupling according to claim 1, wherein the rotary actuator and the frictional engagement section are disposed with rotation axes thereof being aligned with each other.

3. A torque transmission coupling comprising:
input-output rotary members rotatably supported to perform input-output transmission of torque;
a frictional engagement section provided between the input-output rotary members to perform torque transmission between the input-output rotary members by enforcing frictional engagement;
a compression member set that comprises a pair of members capable of performing relative rotation and that generates thrust through the relative rotation between the members to thereby cause the frictional engagement section to perform the frictional engagement; and
a rotary actuator that causes both of the members of the compression member set to perform engagement-rotational driving whereby to cause the relative rotation;
the compression member set is a compression gear set that comprises a pair of gears provided as the pair of members, an outer gear engaged with the gears and an outer gear support for supporting the outer gear, and that converts an input generated by rotational driving into a compression force in the direction along a rotation axis to thereby cause the frictional engagement section to enforce the frictional engagement wherein gear ratios or engagement, radii between the pair of individual gears and the outer gear are different from each other; any one of the pair of gears, the outer gear, and the outer gear support is non-rotatably supported; any other one thereof is rotationally driven; and the other thereof performs the relative rotation;
the rotary actuator performs the rotational driving; and
the pair of gears comprise a proximal gear and a distal gear;
the distal gear being disposed further from the rotary actuator than the proximal gear; and
the proximal gear being disposed radially inward of said outer gear;
wherein the coupling further comprises:
an exterior housing;
a pinion shaft rotatably connected with the input rotary member;
the pinion shaft being rotatably supported within the housing by a pair of axially spaced bearings; and
center axises of each bearing and said pinion shaft being mutually angularly offset;
wherein:
the rotary actuator performs the rotational driving of the one of the pair of gears;
the outer gear support is non-rotatably supported;
a cam mechanism is interposed between the pair of gears;
the gear ratios or the engagement radii between the pair of individual gears and the outer gear are different from each other;
the outer gear support is supported to be capable of performing constant-angle relative rotation;
an urging member to be interposed between the outer gear support and a support body side is provided for biasing against rotation of the outer gear support;
the torque transmission coupling further comprises displacement detection means that detects a displacement amount when the outer gear support performs rotational displacement in resistance with the urging member;

an engagement force of the frictional engagement section is obtained in accordance with the displacement amount detected; and
the outer gear support comprises:
first and second radially extending plates disposed on axially opposing ends of the outer gear;
a pin connecting the plates and supporting the outer gear;
one of the plates including a cutout, the cutout having a first end disposed between an inner and outer radius of the plate and the cutout extending tangentially from the first end; and
the urging member being a biasing member that engages the plate cutout.

4. A torque transmission coupling according to claim 3, wherein the rotary actuator and the frictional engagement section are disposed with rotation axes thereof being aligned with each other.

5. A torque transmission coupling comprising:
input-output rotary members rotatably supported to perform input-output transmission of torque;
a frictional engagement section provided between the input-output rotary members to perform torque transmission between the input-output rotary members by enforcing frictional engagement;
a compression member set that comprises a pair of members capable of performing relative rotation and that generates thrust through the relative rotation between the members to thereby cause the frictional engagement section to perform the frictional engagement; and
a rotary actuator that causes both of the members of the compression member set to perform engagement-rotational driving whereby to cause the relative rotation;
the compression member set is a compression gear set that comprises a pair of gears provided as the pair of members, an outer gear engaged with the gears and an outer gear support for supporting the outer gear, and that converts an input generated by rotational driving into a compression force in the direction along a rotation axis of the compression member set to thereby cause the frictional engagement section to enforce the frictional engagement, wherein gear ratios or engagement radii between the pair of individual gears and the outer gear are different from each other; any one of the pair of gears, the outer gear, and the outer gear support is non-rotatably supported; any ocher one thereof is rotationally driven; and the other thereof performs the relative rotation;
the rotary actuator performs the rotational driving; and
the pair of gears comprise a proximal gear and a distal gear;
the distal gear being disposed further from the rotary actuator than the proximal gear; and
the proximal gear being disposed radially inward of said outer gear;
the coupling further comprising an exterior housing and the outer gear support being supported to be capable of performing constant-angle relative rotation and capable of revolving relative to the exterior housing about the rotation axis of the compression member set;
an urging member to be interposed between the outer gear support and a support body side is provided for biasing against rotation of the outer gear support;
the torque transmission coupling further comprises displacement detection means that detects a displacement amount when the outer gear support performs rotational displacement in resistance with the urging member; and an engagement force of the frictional engagement section being obtained in accordance with the displacement amount detected;

the outer gear support comprises:

first and second radially extending plates disposed on axially opposing ends of the outer gear;

a pin connecting the plates and supporting the outer gear;

one of the plates including a cutout, the cutout having a first end disposed between an inner and outer radius of the plate and the cutout extending tangentially from the first end; and the urging member being a biasing member that engages the plate cutout.

6. The coupling of claim 5, further comprising:

an exterior housing;

a pinion shaft rotatably connected with the input rotary member;

the pinion shaft being rotatably supported within the housing by a pair of axially spaced bearings; and center axises of each bearing and said pinion shaft being mutually angularly offset.

7. A torque transmission coupling comprising:

input-output rotary members rotatably supported to perform input-output transmission of torque;

a frictional engagement section provided between the input-output rotary members to perform torque transmission between the input-output rotary members by enforcing frictional engagement;

a compression member set that comprises a pair of members capable of performing relative rotation and that generates thrust through the relative rotation between the members to thereby cause the frictional engagement section to perform the frictional engagement; and a rotary actuator that causes both of the members of the compression member set to perform engagement-rotational driving whereby to cause the relative rotation;

the compression member set is a compression gear set that comprises a pair of gears provided as the pair of members, an outer gear engaged with the gears and outer gear support for supporting the outer gear, and that converts an input generated by rotational driving into a compression force in the direction along a rotation axis of the compression member to thereby cause the frictional engagement section to enforce the frictional engagement, wherein gear ratios or engagement radii between the pair of individual gears and the outer gear are different from each other; any one of the pair of gears, the outer gear, and the outer gear support is non-rotatably supported; any other one thereof is rotationally driven; and the other thereof performs the relative rotation;

the rotary actuator performs the rotational driving; and the pair of gears comprise a proximal gear and a distal gear;

the distal gear being disposed further from the rotary actuator than the proximal gear; and a press member provided between the frictional engagement section and the compression member set, receiving the thrust from the compression member set to cause the frictional engagement;

wherein the coupling further comprises a support boss section circumferentially provided on an inner circumference of the press member so as to be extended toward the distal gear;

the distal gear is supported relatively rotatable around an outer circumferential surface of the support boss section.

8. A torque transmission coupling comprising;

input-output rotary members rotatably supported co perform input-output transmission of torque;

a frictional engagement section provided between the input-output rotary members to perform torque transmission between the input-output rotary members by enforcing frictional engagement;

a compression member set that comprises a pair of members capable of performing relative rotation and that generates thrust through the relative rotation between the members to thereby cause the frictional engagement section to perform the frictional engagement; and a rotary actuator that causes both of the members of the compression member set to perform engagement-rotational driving whereby to cause the relative rotation;

the compression member set is a compression gear set that comprises a pair of gears provided as the pair of members, an outer gear engaged with the gears and an outer gear support for supporting the outer gear, and that converts an input generated by rotational driving into a compression force in the direction along a rotation axis of the compression member to thereby cause the frictional engagement section to enforce the frictional engagement, wherein gear ratios or engagement radii between the pair of individual gears and the outer gear are different from each other; any one of the pair of gears, the outer gear, and the outer gear support is non-rotatably supported; any other one thereof is rotationally driven; and the other thereof performs the relative rotation;

the rotary actuator performs the rotational driving; and the pair of gears comprise a proximal gear and a distal gear;

the distal gear being disposed further from the rotary actuator than the proximal gear;

wherein the rotary actuator comprises an electric motor and an output shaft that is divided from and supports the proximal gear;

the output shaft is supported to an exterior housing by bearings which are disposed in both sides of the electric motor in the direction along the rotational axis;

one end of the output shaft disposed in the compression member set side is extended toward the compression member set so as to protrudes from one bearing disposed in the compression member set side in the direction along the rotational axis, the proximal gear is detachebly connected to the one end of the output shaft.

* * * * *